(12) United States Patent
Decruy et al.

(10) Patent No.: US 12,180,991 B2
(45) Date of Patent: Dec. 31, 2024

(54) FURNITURE ASSEMBLY, IN PARTICULAR A DRAWER

(71) Applicant: Decruy NV, Houthulst (BE)

(72) Inventors: Frederik Decruy, Merkem (BE); Alexander Decruy, Houthulst (BE)

(73) Assignee: DECRUY NV, Houthulst (BE)

( * ) Notice: Subject to any disclaimer, the term of this patent is extended or adjusted under 35 U.S.C. 154(b) by 0 days.

(21) Appl. No.: 17/277,321

(22) PCT Filed: Sep. 19, 2019

(86) PCT No.: PCT/IB2019/057916
§ 371 (c)(1),
(2) Date: Mar. 18, 2021

(87) PCT Pub. No.: WO2020/058902
PCT Pub. Date: Mar. 26, 2020

(65) Prior Publication Data
US 2022/0034343 A1     Feb. 3, 2022

(30) Foreign Application Priority Data
Sep. 19, 2018    (BE) .................................. 2018/5641

(51) Int. Cl.
*A47B 88/90*       (2017.01)
*F16B 5/00*        (2006.01)

(52) U.S. Cl.
CPC ............ *F16B 5/008* (2013.01); *A47B 88/941* (2017.01)

(58) Field of Classification Search
CPC .............................. A47B 88/941; F16B 5/008
USPC ................................................ 312/263, 348.4
See application file for complete search history.

(56) References Cited

U.S. PATENT DOCUMENTS

| 4,173,380 A | * | 11/1979 | Dupree | ................ A47B 88/906 312/348.4 |
| 4,957,386 A | * | 9/1990 | Harley | ................ F16B 12/2063 403/231 |
| 5,226,808 A | * | 7/1993 | Harley | ................ A47B 88/941 411/340 |
| 5,489,148 A | * | 2/1996 | Grass | ..................... A47B 88/90 312/348.3 |

(Continued)

FOREIGN PATENT DOCUMENTS

| DE | 29507834 U1 | 7/1995 |
| DE | 202005001281 U1 | 3/2005 |

(Continued)

*Primary Examiner* — James O Hansen
(74) *Attorney, Agent, or Firm* — Cermak & McGowan LLP; James Creighton Wray; Malcolm K. McGowan

(57) ABSTRACT

The present invention relates to a furniture assembly, in particular a drawer comprising at least two furniture panels (1,2) which are connectable at right angles to each other, comprising a connecting element suitable for producing a perpendicular connection between two furniture panels (1,2), wherein at least one furniture panel (1,2) is provided with a bore (4, 80) for receiving at least a part of the connecting element, wherein the connecting element comprises an elongate securing part which, in use, is at least partly provided in the one panel (1), and furthermore comprises a bent engagement part (19), the end (7) of which, in use, penetrates into the wall of the bore (4) of the other panel (2).

10 Claims, 19 Drawing Sheets

(56) References Cited

U.S. PATENT DOCUMENTS

| | | | | | |
|---|---|---|---|---|---|
| 5,618,091 | A | * | 4/1997 | Huber | A47B 88/941 |
| | | | | | 312/265.5 |
| 5,647,711 | A | * | 7/1997 | Berger | A47B 88/423 |
| | | | | | 411/401 |
| 6,286,186 | B1 | * | 9/2001 | Lautenschlager | A47B 95/00 |
| | | | | | 16/272 |
| 6,817,686 | B1 | * | 11/2004 | Whittlesea | A47B 88/427 |
| | | | | | 312/348.4 |
| 2017/0175789 | A1 | * | 6/2017 | Mätzler | F16B 12/24 |

FOREIGN PATENT DOCUMENTS

| | | | | |
|---|---|---|---|---|
| FR | 2336103 A1 | | 7/1977 | |
| WO | WO 97/16090 | * | 5/1997 | ............. A47B 88/00 |
| WO | 2014122003 A1 | | 8/2014 | |

* cited by examiner

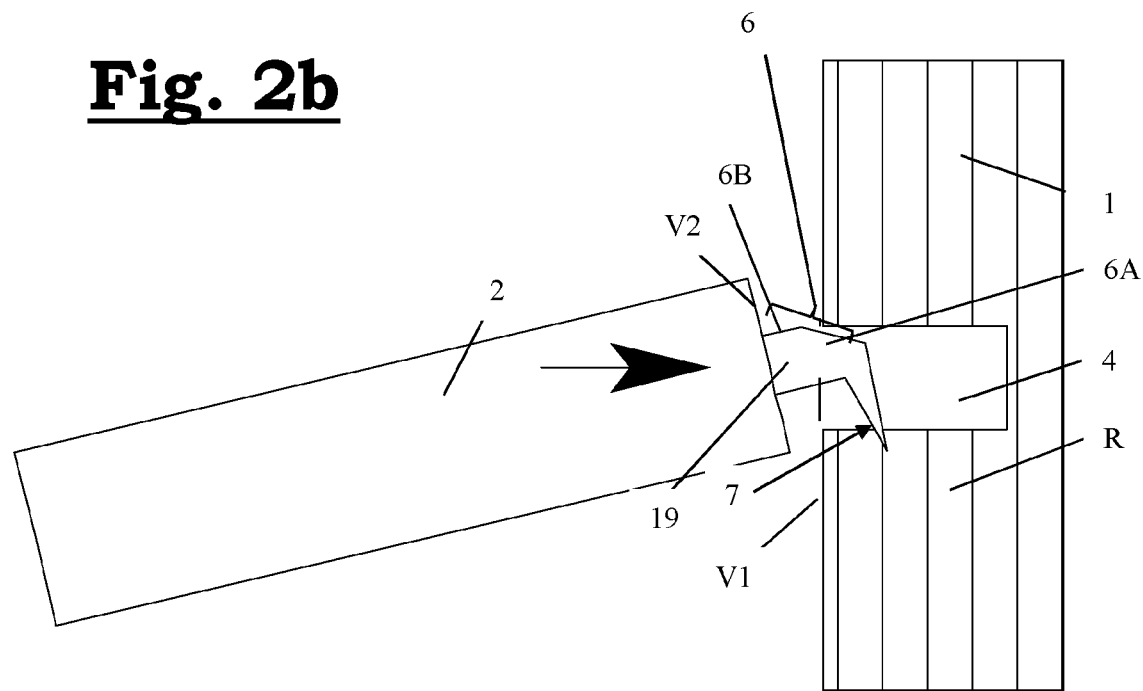
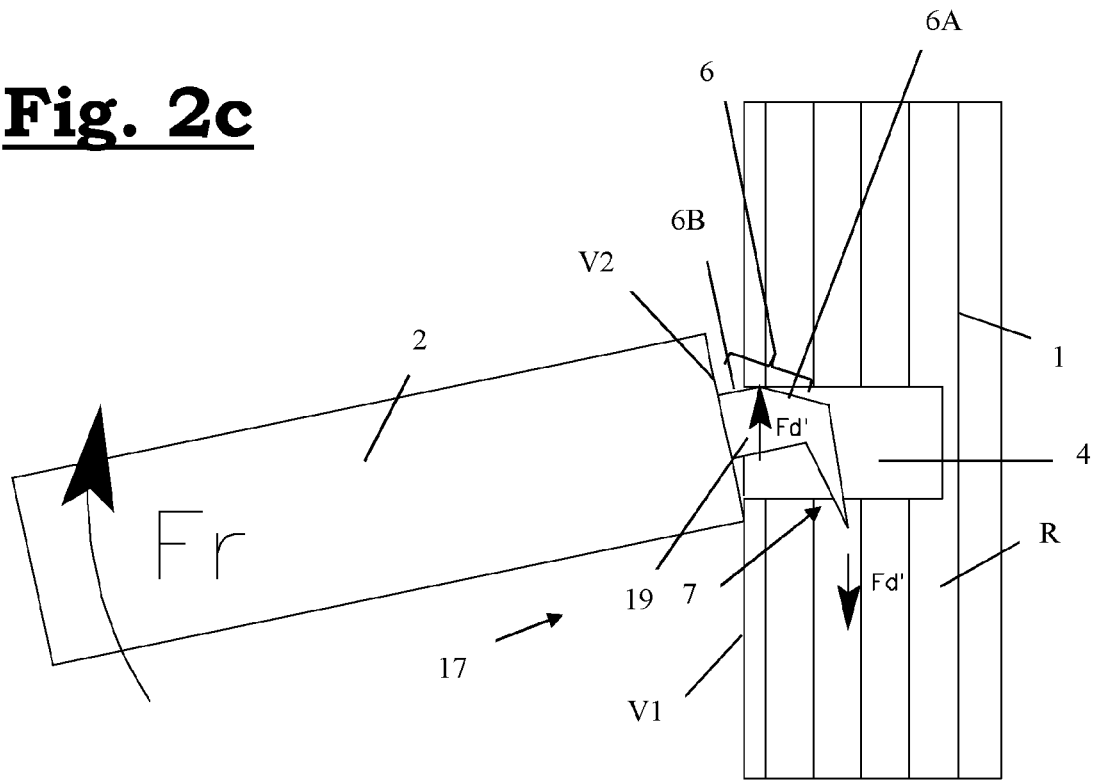

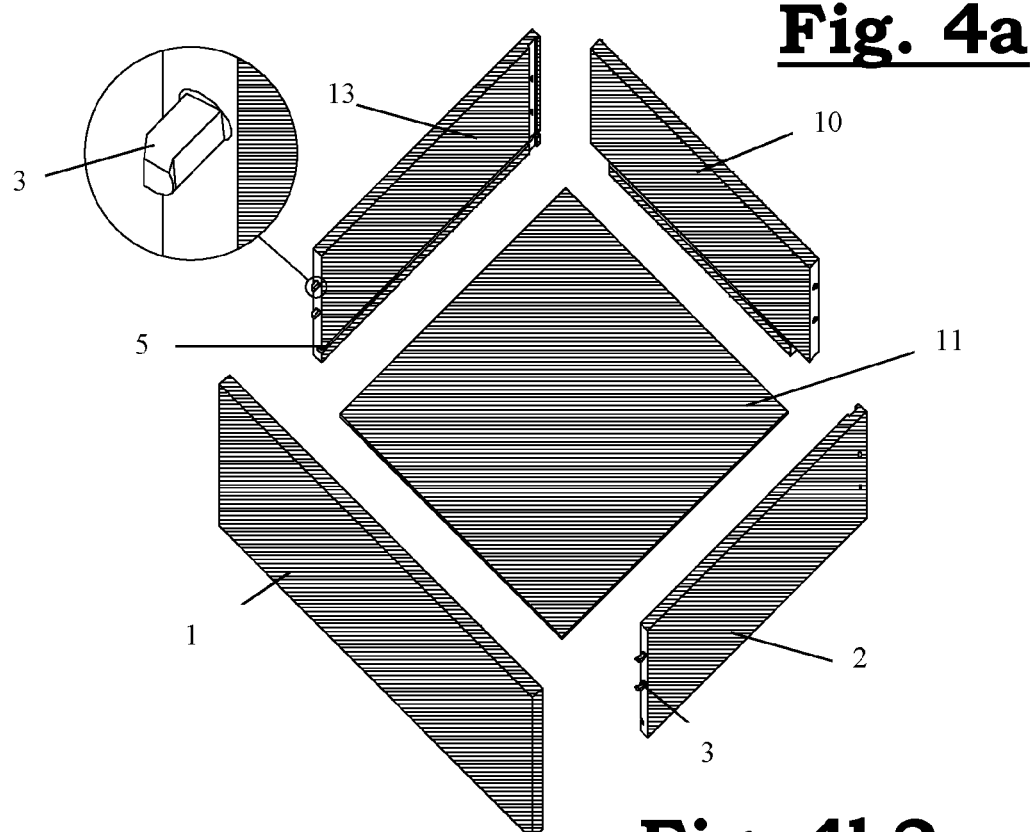
Fig. 4a
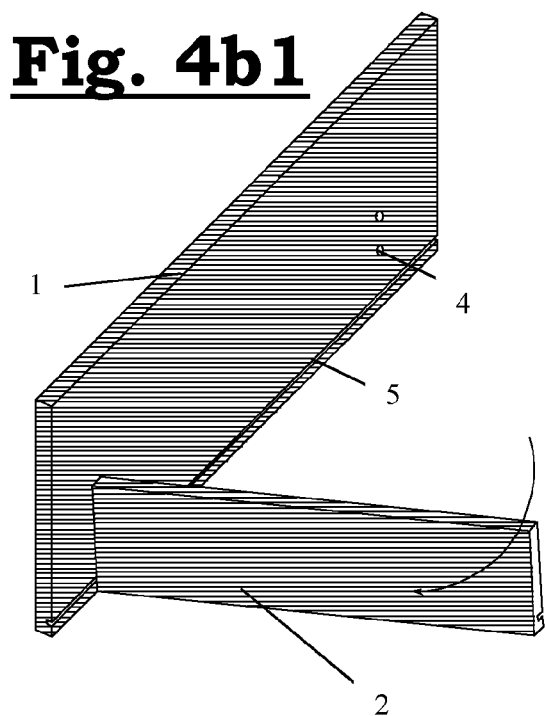
Fig. 4b1
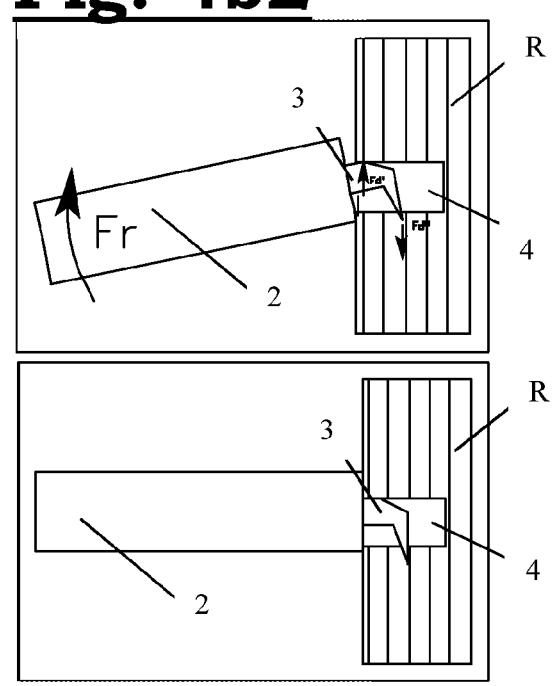
Fig. 4b2
Fig. 4b3

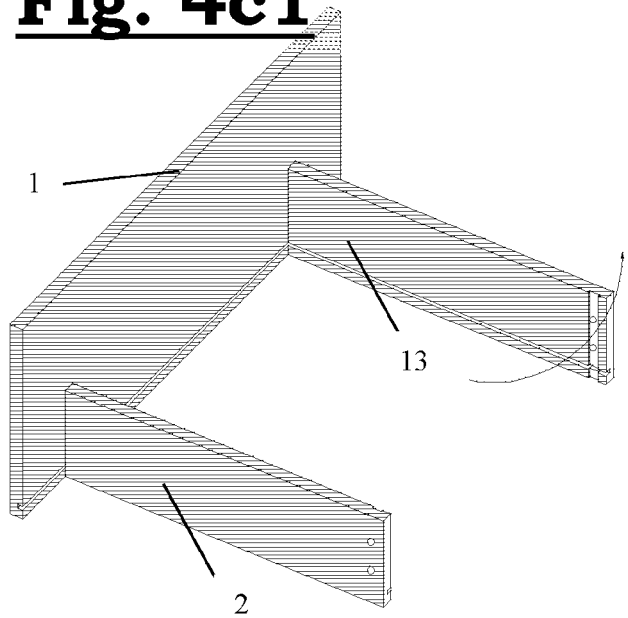
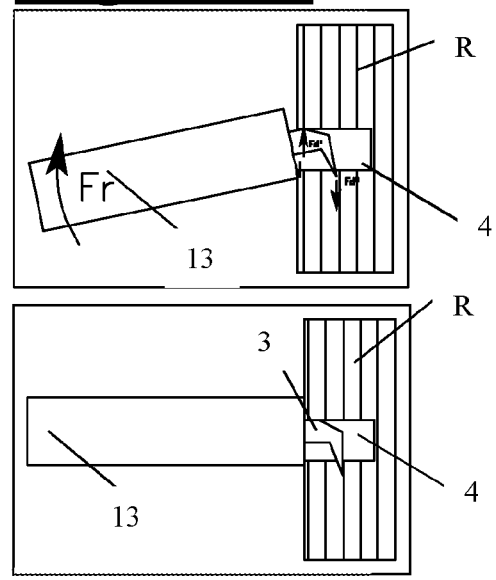
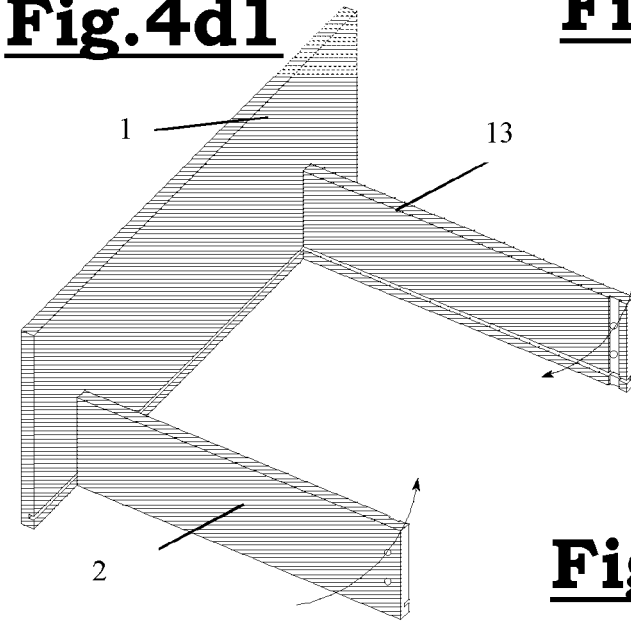
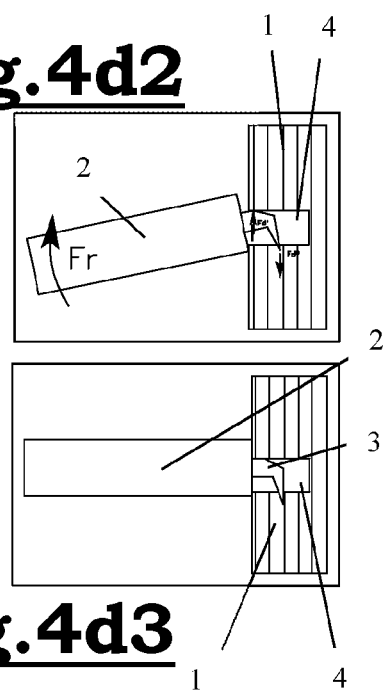

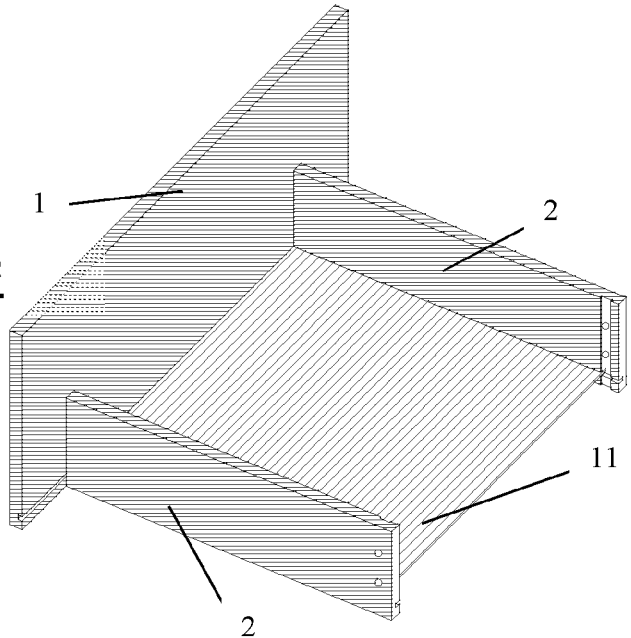
Fig. 4e
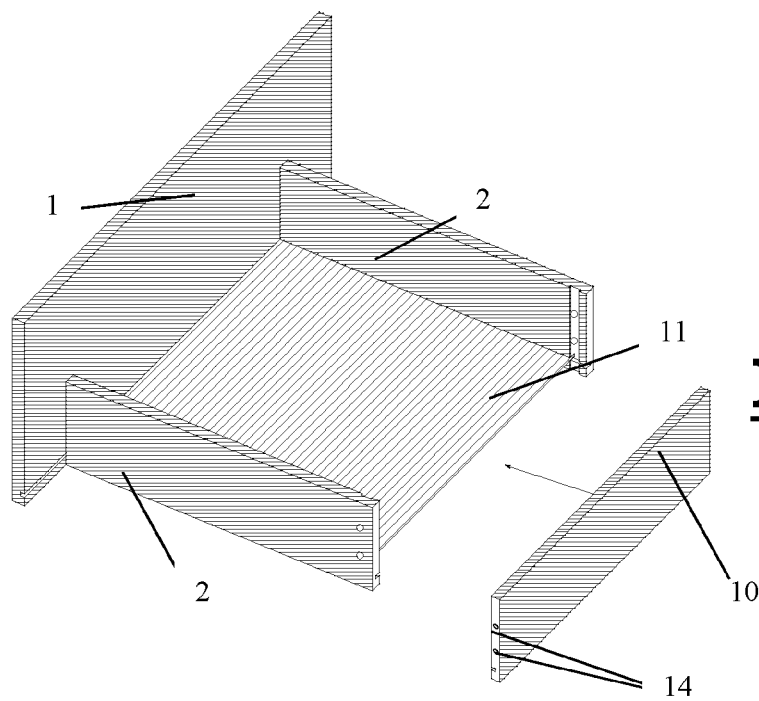
Fig. 4f1

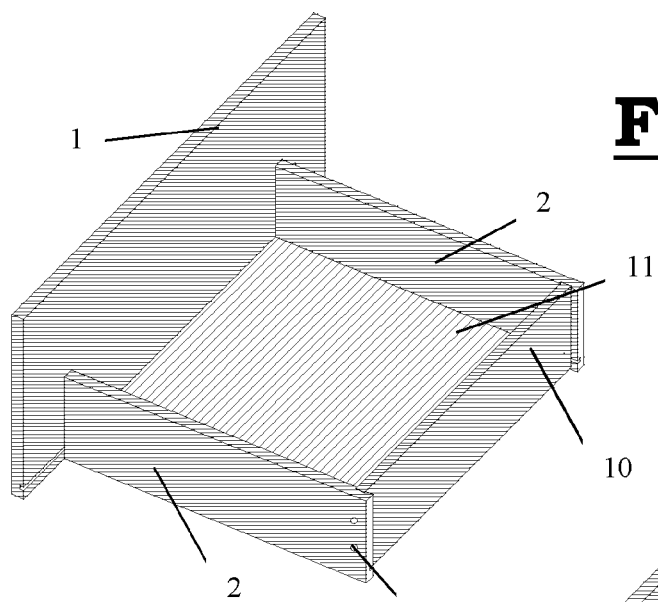
Fig. 4f2
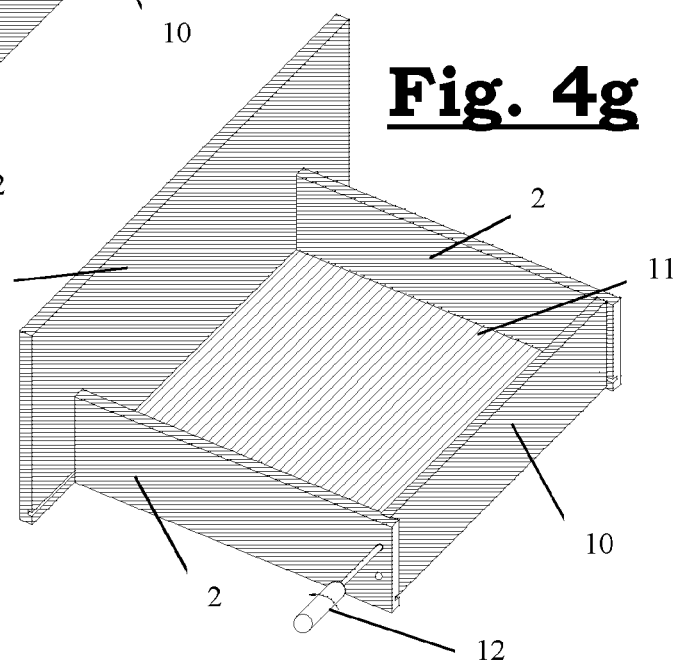
Fig. 4g
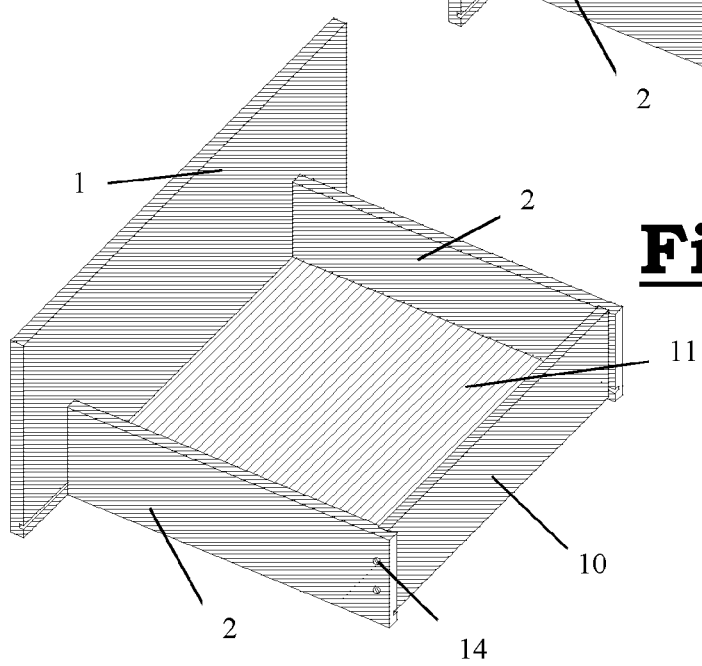
Fig. 4h

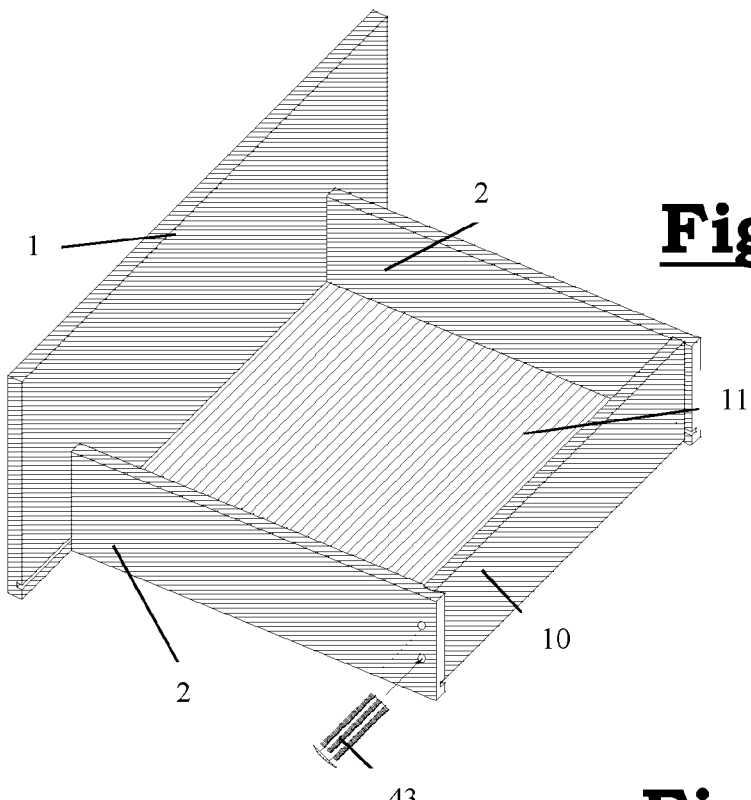
Fig. 4i
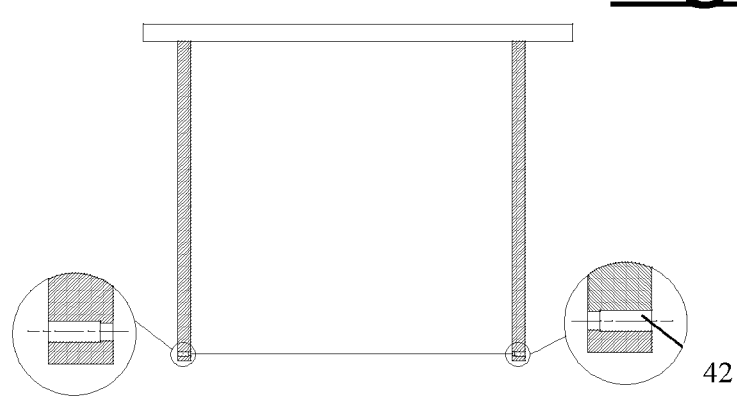
Fig. 4j1
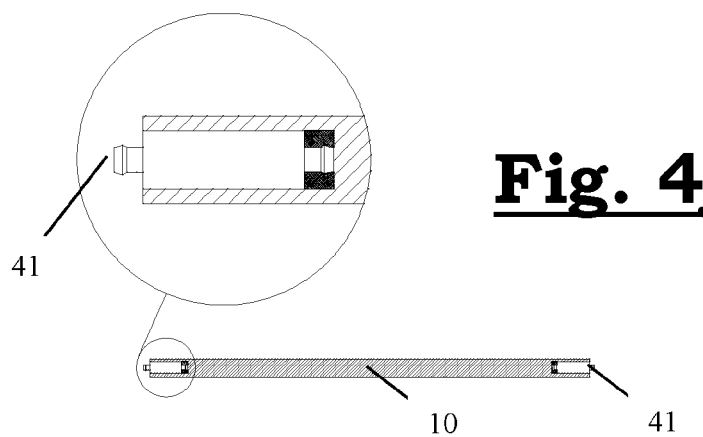
Fig. 4j2

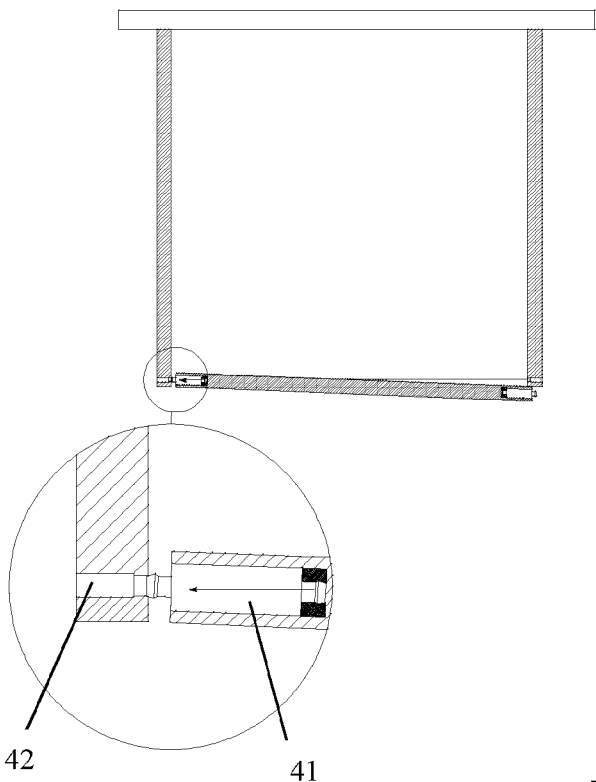
Fig. 4j3
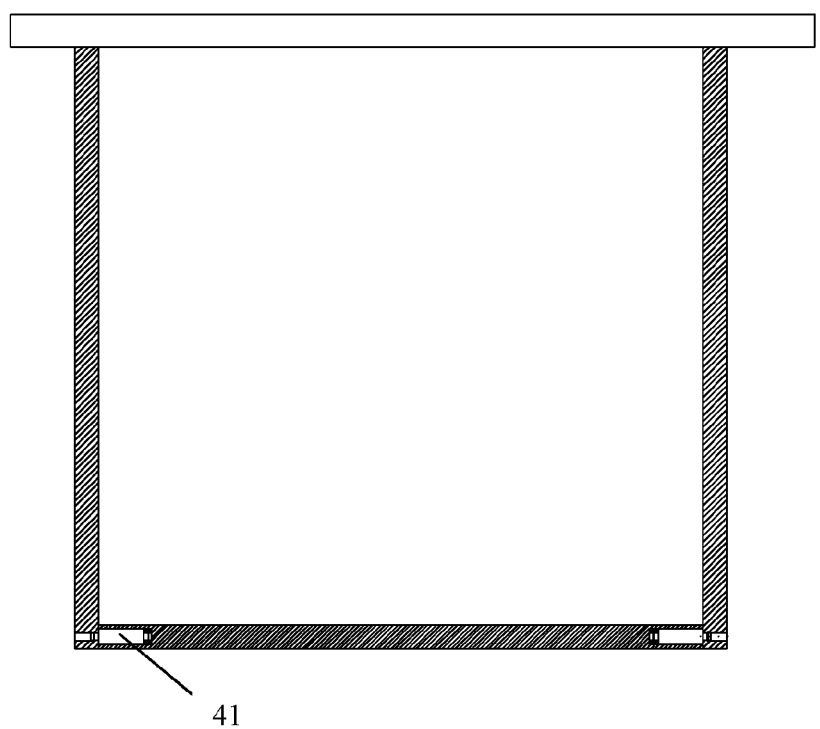
Fig. 4j4

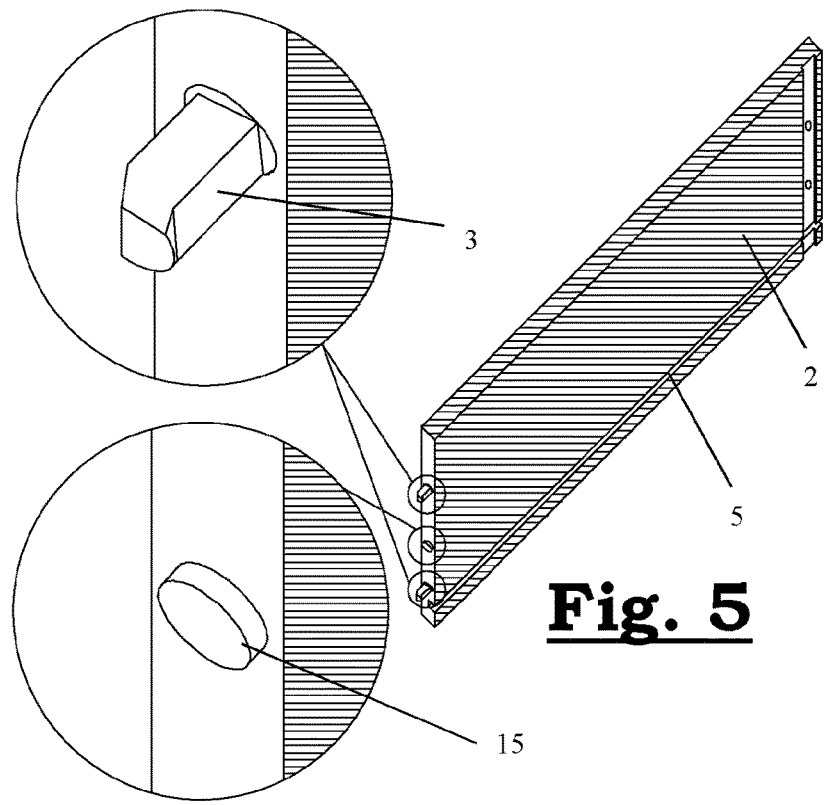
Fig. 5
Fig. 6.1
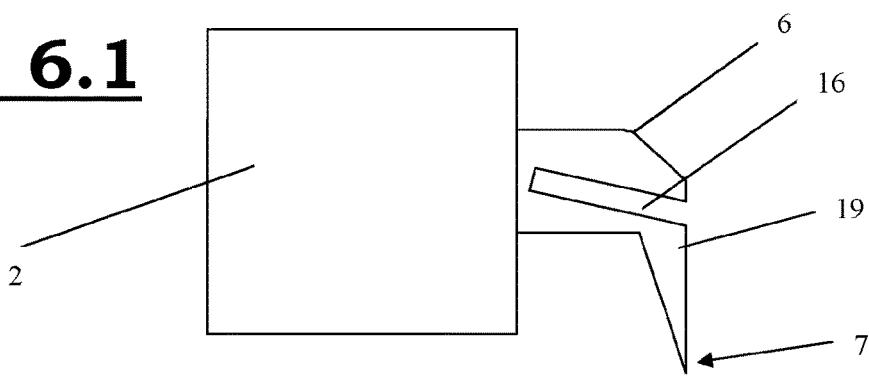
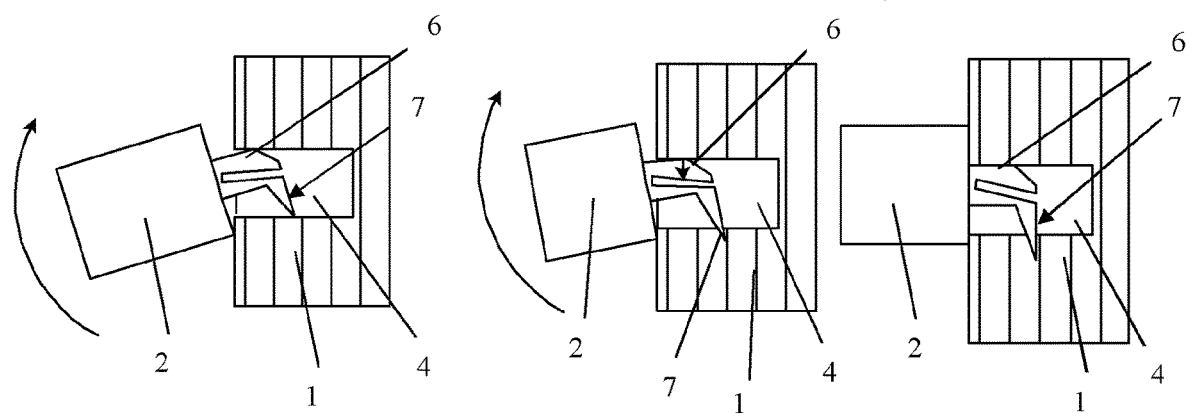
Fig. 6.2. Fig. 6.3. Fig. 6.4.

Fig. 7.1
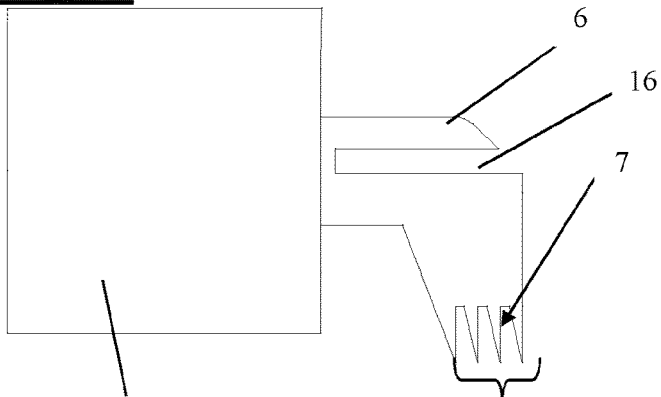
Fig. 7.2. 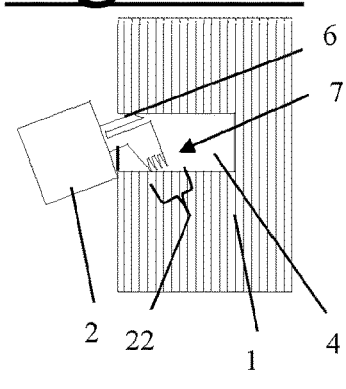 Fig. 7.3. 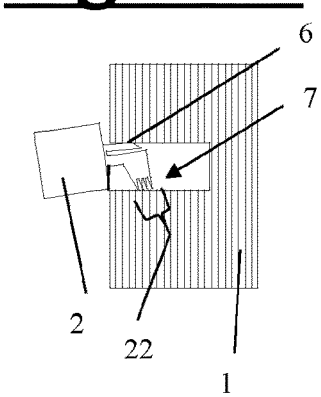 Fig. 7.4. 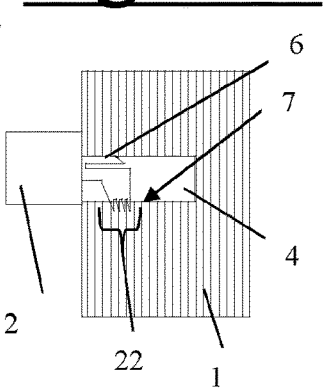
Fig. 8.1. 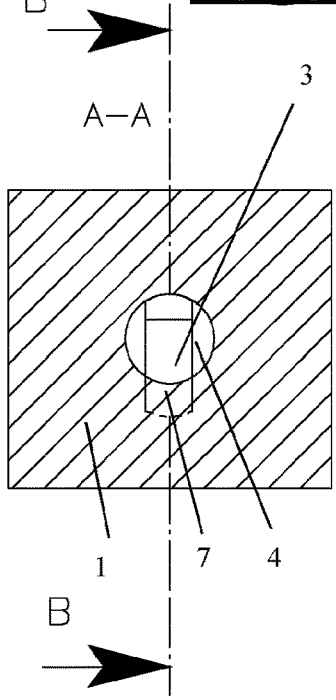 Fig. 8.2. 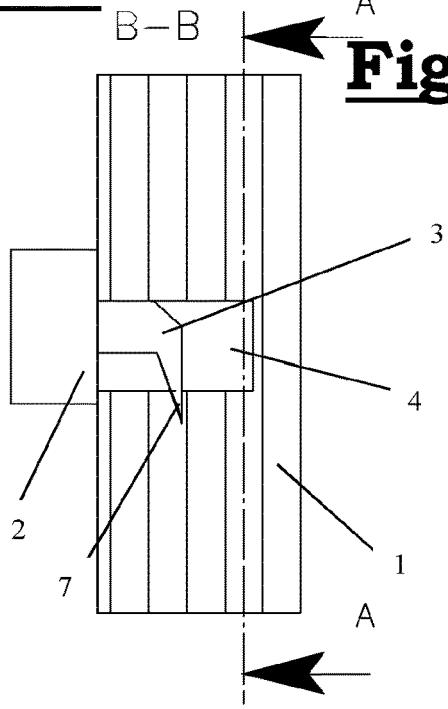

Fig. 9.1.
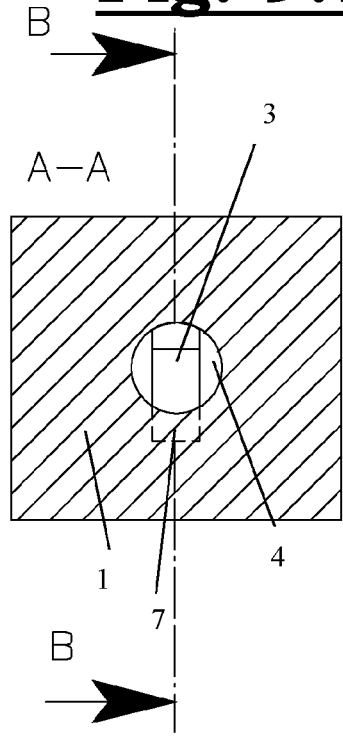
Fig. 9.2.
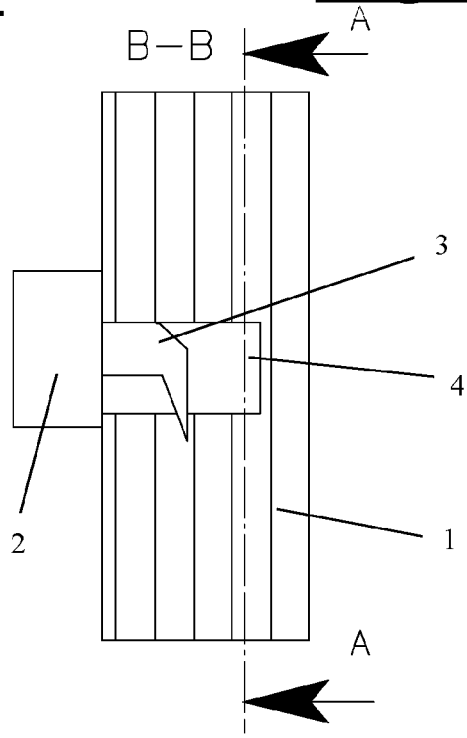
Fig. 10.1.
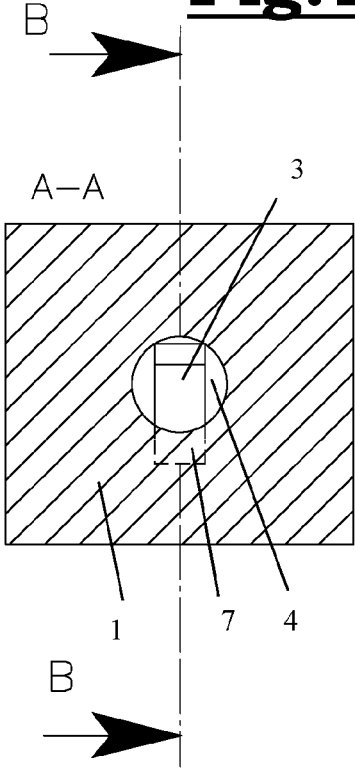
Fig. 10.2.
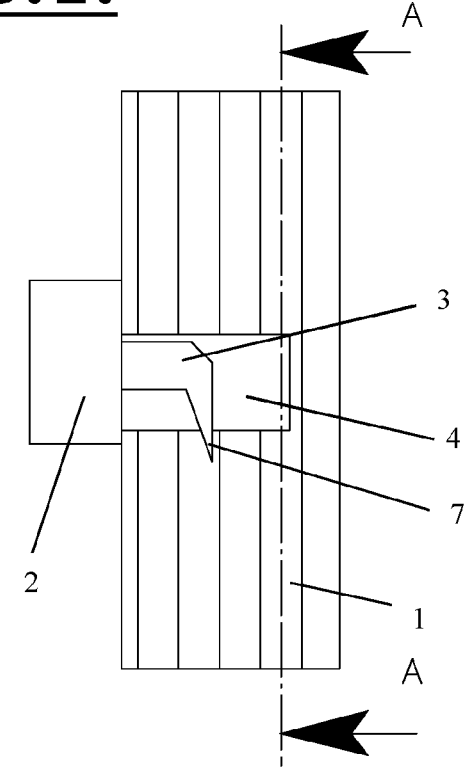

Fig.15.a.
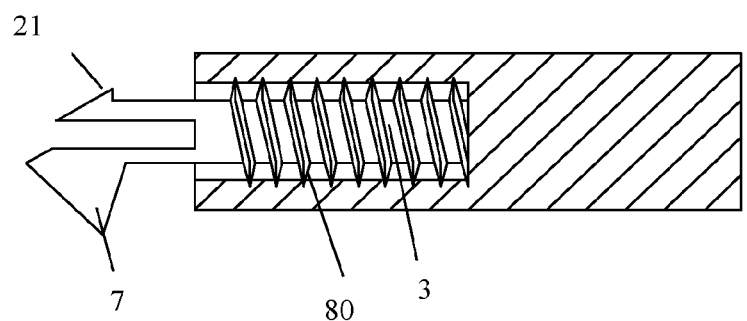
Fig.15.b.
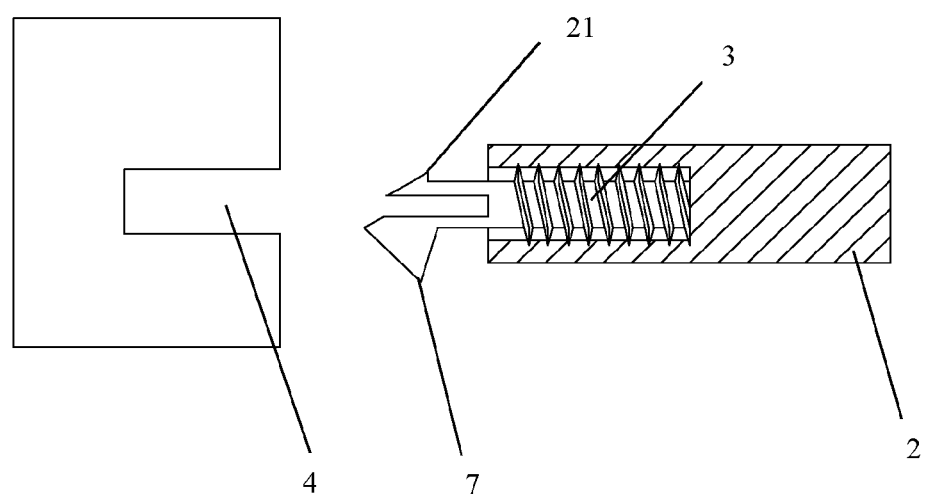

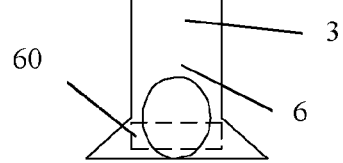
Fig.16.a
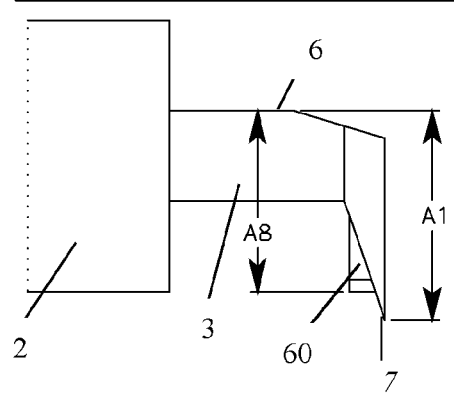
Fig.16.b
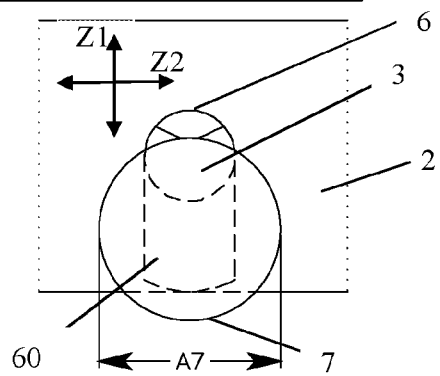
Fig.16.c
Fig.17.a
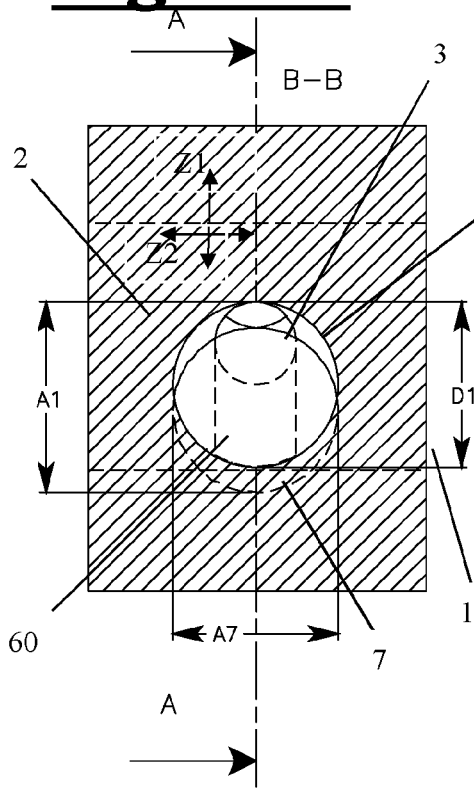
Fig.17.b
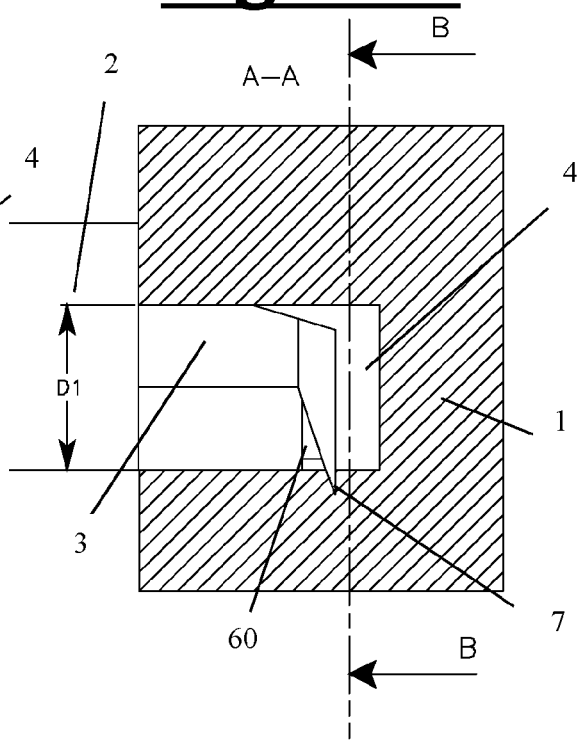

FURNITURE ASSEMBLY, IN PARTICULAR A DRAWER

This application claims the benefit of Belgian Application No. BE2018/5641 filed Sep. 19, 2018 and PCT/IB2019/057916 filed Sep. 19, 2019, International Publication No. WO 2020/058902 A1, and the amended sheets under Article 19, which are hereby incorporated by reference in their entirety as if fully set forth herein.

The present invention relates, on the one hand, to a furniture assembly comprising at least two furniture panels which are connectable at right angles to each other, as described in the preamble of the first claim. On the other hand, the present invention relates to a connecting element for connecting two furniture panels at right angles.

The present invention relates in particular to a connection for furniture panels, more particularly to the connection between the side panels of a drawer and the front panel, and the assembly of a drawer or drawer box in which aforementioned connection is incorporated.

Various different types of drawers and techniques of assembling drawers already exist. Thus, it is possible to draw a distinction between, on the one hand, a folding drawer and, on the other hand, a disassemblable drawer. The present patent application relates in particular to an improved connecting technique for disassemblable drawers.

The folding drawer is a drawer wherein the side walls, the rear wall and optionally also the front wall are made in one piece. Assembly will be effected by folding the various walls in such a way that they close to form a box. The connection between these walls is usually reinforced by a glue or an adhesive in the folded form. In the non-folded state, the various walls are only connected to each other by means of a layer-like coating. This layer-like coating is usually a plastic film. The carrier material of these drawers may be MDF, LDF, chipboard, a wood-based panel material or a plastic profile.

With a disassemblable drawer, the various components (side walls, the front and rear walls and the bottom panel) are separate from each other and can be coupled together by means of connecting means (coupling means). These connecting means may be incorporated in the panel or in the wall elements in the form of a click-fit system or coupling system, this coupling system consisting of a tongue and a groove in which both the tongue and the groove are provided with mutually cooperating barbs. On the other hand, the connecting means may also be external elements in the form of eccentric connections, wooden or plastic punches which may optionally be provided with barbs.

Both types of drawers have their typical advantages and disadvantages. Thus, a folding drawer is often unwieldy and too big to fit into a standard packaging, since all components are connected to each other. In addition, the connection is rather fragile in the non-folded form, since the connection generally only consists of a plastic coating layer, as a result of which the connection may break apart.

With disassemblable drawers, the walls are not connected to each other, but there is the drawback that this type of drawer is often more expensive than the folding drawer, since the various components all have to be produced separately. In addition, the disassemblable drawers have the significant drawback that many fittings are required to be able to assemble the drawer.

This means that the fitter or consumer first has to spend a considerable amount of time to bring all the required fittings together and then to fit all fittings correctly in order to be able to perform the assembly. After all, if one buys a ready-to-assemble or flat-pack piece of furniture, the packaging contains various small bags, as a result of which it is often not clear which fittings are intended for which component. In addition, it frequently happens that components or fittings are supplied incorrectly or in insufficient numbers in the packaging and then have to be supplied retrospectively, resulting in additional expenses. Another drawback is the fact that protective caps or fittings will generally still be visible after assembly, which is less desirable from an aesthetic point of view.

German Utility Model DE 295 07 834 U1 describes a connecting element for producing a connection between a hollow profiled-section rail and a drawer front. The connecting element described comprises an elongate securing part which, in use, is at least partly provided in the hollow profiled-section rail, and furthermore a bent engagement part, the end of which, in use, penetrates the wall of a bore of the drawer front. In order to ensure a good connection and thus to prevent the occurrence of play between the profiled-section rail and the drawer front, the profiled-section rail has to be rotated, so that the profiled-section rail is pulled against the internal surface of the drawer front. However, when connecting two furniture panels in order to form a drawer, it is not possible to work in this way, because it is not possible to cause the side walls to rotate while connecting the latter to the front wall.

It is therefore an object of the present invention to provide a furniture assembly, in particular a disassemblable drawer, which offers a solution for the abovementioned drawbacks and which makes it possible to connect at least a number of components thereof to each other in a simple manner and without play.

The object of the invention is achieved by providing a furniture assembly comprising at least two furniture panels which are connectable at right angles to each other as described in the first claim. Due to the fact that the end extends at least partly in the material of the other panel, both panels are coupled to each other. Said end forms part of a tongue-shaped part of the engagement part. Due to the fact that the respective end extends beyond the prolongation of the side face of the panel in which the securing part is provided, a good connection between both furniture panels is achieved. The connection between both furniture panels is such that there is no play (space) between the panels in pre-assembled form. Preferably, the head-end front or rear side of a furniture panel is provided with two spaced-apart connecting elements in order to connect two furniture panels at right angles to each other.

In particular, in order to produce the perpendicular connection, the two furniture panels are turned with respect to each other, with the end of the engagement part penetrating the wall of the bore as a result of the turning movement being executed. By using such a connecting element, it is easy to connect furniture panels perpendicular to each other without having to resort to milling. Then, only a bore has to be provided for the end of the engagement part.

In a preferred embodiment, the end of the engagement part comprises one or several pointed projections in order to ensure that the end can easily penetrate into the material of the respective panel.

In a more preferred embodiment of the furniture assembly according to the invention, the engagement part comprises one or several positioning means for positioning the one furniture panel with respect to the other. The positioning means will in particular prevent the end of the engagement part from penetrating into the wall further.

In a most preferred embodiment of the furniture assembly according to the invention, the engagement part furthermore comprises a back part which, in use, at least partly bears against the part of the wall of the bore situated opposite the part of the wall of the bore into which the end of the engagement part penetrates in use. While the turning movement is being executed, the back part will provide a lever effect so that sufficient force is generated to enable the end of the engagement part to penetrate into the respective wall of the bore. The back part is preferably provided with a chamfer.

According to a particular embodiment of the furniture assembly according to the invention, the engagement part comprises a groove. The groove preferably extends in a direction along the length direction of the securing part. The groove will provide tension control since it is on account of the groove that the engagement part is able to move elastically, so that the engagement part is able to bend slightly when it is placed under excessive tension, thus making turning of the two panels with respect to each other slightly easier. The groove divides the engagement part into a first part comprising the back part and a second part comprising the end.

In a more particular embodiment of the furniture assembly according to the invention, the securing part is provided with screw thread in order to secure the connecting element in the one furniture panel. Obviously, it is possible to secure the connecting element in the furniture panel in another way, for example by means of gluing or a clamping connection.

The furniture assembly according to the present invention is particularly suitable for forming a drawer, in particular a disassemblable drawer. A drawer comprises two side walls, a front and rear wall and a bottom panel. The above-described connecting element is preferably used to connect the side walls at right angles to the front wall, because by means of said connecting element, it is possible to produce a strong connection which is quite important in the case of the front wall, because that is generally where force is applied, in particular when opening the drawer. The respective side walls each have a head-end front and rear side, a top and bottom face and two side faces. In the assembled state, the head-end front side adjoins the rear face of the front wall.

Other preferred embodiments of the furniture assembly are described in the dependent claims.

Another subject-matter of the present invention relates to a connecting element for connecting two furniture panels at right angles, in which at least one furniture panel is provided with a blind bore for receiving at least a part of the connecting element, wherein the connecting element comprises an elongate securing part which is suitable, in use, to be at least partly provided in the one panel, and furthermore comprises a bent engagement part, the end of which is provided to, in use, penetrate into the wall of the bore of the perpendicularly adjoining panel. By means of such a connecting element, it is possible to connect two furniture panels at right angles to each other in a very simple and economical way. The connecting element according to the invention is preferably intended to be used in the furniture assembly according to the invention as described above. With the connecting element according to the invention, the distance from the end to the axis of the elongate securing part is greater than half the thickness of the panel in which the connecting element is fitted.

The present invention additionally relates to a method for connecting two furniture panels at right angles by means of a connecting element according to the invention, wherein the securing part of the connecting element will be placed in the longitudinal edge of the one panel in order to subsequently position the panel with the connecting element with respect to a panel in which a bore is provided and to which it will be connected at right angles. The panel which is provided with the connecting element will be introduced at an angle, with the engagement part of the panel being introduced into the bore of the other panel. Subsequently, the panel with the connecting element is turned until the panels are at right angles with respect to each other. As a result of the turning action, the end of the engagement part will fix itself in the wall of the bore and thus ensure a (strong) connection between both panels.

Furthermore, the present invention relates to a side wall for a disassemblable drawer provided with a connecting element as described above, comprising a head-end front and rear side, a top and bottom face and two side faces, wherein the head-end front side is provided with the elongate securing part of the connecting element and wherein the end of the bent engagement part extends beyond the prolongation of a side face. In particular, the head-end front side is provided with at least one blind bore, preferably with two spaced-apart blind bores, wherein said blind bore is suitable for receiving the elongate securing part. Preferably, two connecting elements are provided for each head-end front side and/or head-end rear side.

In the following detailed description of the connecting element and furniture assembly according to the present invention and the perpendicular connection produced, said features and advantages of the invention are explained in more detail. It will be clear that the sole aim of this description is to explain the general principles of the present invention by means of a number of concrete examples, and that nothing in this description may thus be interpreted as a limitation of the scope of the patent rights defined in the claims or of the area of application of the present invention.

In the following description, reference numerals are used to refer to the attached figures.

A first aspect of the present invention is that a connection is created in which the bore does not require a screw thread or click-fit grooves. If the screw thread has to be produced by machine or if a groove has to be milled, this increases the production time and will result in an enormous increase in the production costs.

Also, many furniture producers have production lines for producing bores. If these lines have to be converted or investments have to be made in new production lines, this will again make this product more expensive. The carrier material of the furniture components which have to be connected is MDF or chipboard. These materials are inherently partly layered. The layers are situated in the longitudinal direction of the panel, parallel to the face in which the bore is present. If we want to create an anchoring, this may be done between the layers of the carrier material.

A second aspect of the present invention is that the connection between the two panels is designed in such a manner that the tolerances in the panel, glue and the film of the two panels can be compensated for. A chipboard or an MDF panel has tolerances of +/−0.3 mm. It is important to achieve a good connection in which the longitudinal end of the first panel (2) is pulled against the surface of the second panel, so that no air gap will be visible. Thus, the connection has to be such that the two abovementioned surfaces are pulled against each other or at least be such that no significant air gap is visible between the panels after assembly.

The third aspect is that the connection has to be such that no additional fittings are to be used. This means that no eccentric, coupling pieces, protective caps or the like are allowed to make the connection possible.

Thus, it is important that all connecting elements are already provided in the panels and that these are no longer visible after assembly of the panels. This is solved by using a connecting element (insert or punch) which is provided with a sharp barb. This will be explained in the description below.

In addition, it is also important that assembly can be effected without the use of tools, so that assembly may take place in a quick and simple manner.

The fourth aspect of the present invention is that a drawer may be designed in such a way that it can be produced with as few as possible passages, so that the drawer according to the invention approaches the price level of a folding drawer.

This 4th aspect is achieved by manufacturing the left-hand and right-hand side walls in one operation. This is possible due to the fact that the left-hand and the right-hand side wall can be manufactured from one and the same piece or drawer profile. This is now possible due to a specially designed machine.

BRIEF DESCRIPTION OF THE DRAWINGS

List of the Figures and Description Thereof

Figure 1:
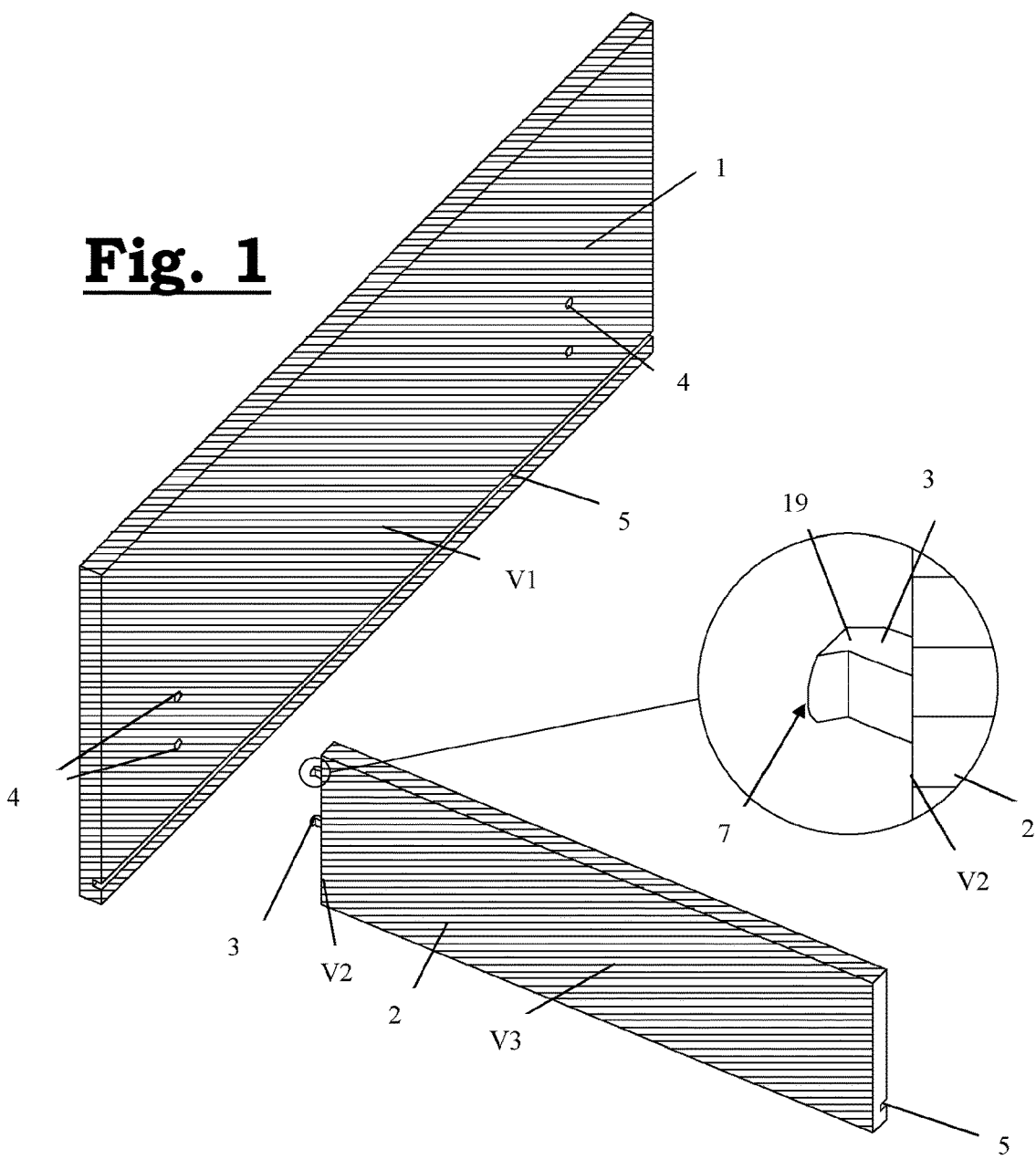
FIG. 1

Furniture assembly (17) between two furniture panels (1,2), such as with the invention. The figure shows two panels (1,2). Several bores (4) are present in the face (V1) of the first panel (1). These bores (4) may be blind bores, but may also be through-bores. At the longitudinal end of the panel (2), two connecting elements (3) are present. This longitudinal end is a face (V2) in which the connecting elements (3) are situated. It should be understood that it is possible for fewer or more connecting elements (3) to be present and that, in addition, these connecting elements (3) may be combined with, for example, positioning bodies or other connecting elements (3). In order to produce a connection which is as beautiful as possible, the face (V1) of the first panel and the face (V2) of the second panel should adjoin each other as closely as possible. The way in which this may be achieved is explained in further drawings.

Both the first and the second panel have a groove (5). This groove serves to accommodate e.g. a back wall or a bottom panel. These grooves (5) are directed towards the inside of the furniture connection. It should be understood that these panels may contain several more grooves, e.g. in order to fit runners for opening and closing a drawer.

The connecting element (3) consists of an elongate securing part (18) which is anchored in the one panel (1), and furthermore comprises a bent engagement part (19) consisting of a back part (6) and a tongue-shaped part with a pointed end (7) situated opposite. The end (7) of the engagement part (19) is turned towards the side different from that of the groove (5), which means that, in order to connect the two panels at right angles, the second panel will have to be turned, starting from the other side of the groove, in the direction of the bottom groove (5) of the second panel. This assembly is specified in more detail in the following drawings.

The connecting element (3) may be made from metal, a metal alloy, a plastic, wood, a WPC, a composite or optionally from the carrier material of the furniture panel (2) itself.

The carrier material of the panels may differ. Thus, it is possible for it to be made of a chipboard panel, an MDF panel, a WPC, a multiplex panel or another wood-based panel material. Plastic panels are also possible. MDF, chipboard or multiplex panels do have the advantage that they are largely layered, which makes it possible for the end (7) of the engagement part (19) to penetrate the wall of the bore (4) more efficiently, due to the fact that the relatively sharp tongue can penetrate between the layers of the carrier material.

The furniture panels (1 and 2) are at least partly provided with a decorative top layer. This top layer may be a paper sheet, a plastic film, a lacquer or a variant thereof.

These sheets/films are generally glued to the carrier material by means of a glue. Other types of decorative sheet/film are also possible.

FIG. 2a

Drawing of a furniture assembly (17) according to the invention. The figure shows a top view of the panel (1) and the panel (2). The first panel (1) is shown in cross section at the location of the axis of the bore (4). The direction of the hatching of this cross section also indicates the layer direction of the carrier material. In many cases, this carrier material will be an MDF panel or a chipboard panel and these panels or panel materials show a well-known layered construction parallel to the face (V1) containing the bore (4). This layered construction is ideal for ensuring that the (pointed) end (7) of the engagement part (19) of the connecting element (3) can readily penetrate between the layers in the wall of the bore (4) upon assembly of the two panels.

On the panel (2), the face (V2) is specified at the longitudinal end of the panel (2). In this head-end face (V2), the connecting element (3) is anchored by means of an elongate securing part (18). This connecting element (3) consists of an elongate securing part (18) and an engagement part (19) which is in turn constructed from a back part (6) and a tongue-shaped part which is largely situated opposite the latter and has an end (7). The back part (6) is composed of 2 parts, i.e. a part (6B) which is perpendicular to the face (V2), and a part (6A) which is at less than 90° with respect to the face (V2). This helps to make simple assembly possible and will be discussed later in this document. It is evident that other embodiments are also possible. The pointed end (7) of the engagement part (19) is sharp, but this is not always necessary although it does make assembly easier. Thus, the pointed end (7) of the engagement part (19) may also have a rounded point or a levelled point. Thus, it is also possible for the engagement part (19) to be provided with a barb, so that the latter provides some resistance to being removed again after the pointed end (7) has penetrated in the wall of the bore (4), so that the perpendicular connection remains reliably upright upon assembly. This assists assembly.

FIG. 2b

Assembly of a perpendicular connection between two furniture panels (1,2). A furniture panel (2) is introduced into the other furniture panel (1) at an angle of less than 90° with respect to the other furniture panel (1). In this case, the connecting element (3) is introduced in the bore (4) of the second panel.

During this operation, the pointed end (7) of the engagement part (19) has not yet penetrated in the wall of the bore (4).

In order to obtain a beautiful connection, the furniture panel (2) will continue to be inserted into the panel (1) until a point of the face (V2) at the longitudinal end of the furniture panel (2) touches the face (V1) of the other furniture panel (1).

FIG. 2c

Assembly of a perpendicular connection between two furniture panels. When the furniture panel (2) is completely in the other panel (1), a rotating movement/force (Fr) of the first furniture panel (2) with respect to the other furniture panel (1) is started, in the direction of the back part (6) of the engagement part (19). When executing this rotating movement/force (Fr), at least a part of the back side (6) of the connecting element (3) exerts a force (Fd') on the wall of the bore (4), and the end (7) of the engagement part (19) of the connecting element (3) penetrates into the wall of the bore (4) by exerting a force (Fd") on the wall of the bore (4). As a result thereof, a connection is brought about between the two furniture panels. This rotating movement/force (Fr) continues until the furniture panel (2) is at ±90° with respect to the other furniture panel (1). At this point, the connection has been fully achieved.

In principle, this assembly and build-up of forces may be compared to that of a lever. The length of the furniture panel (2) is long compared to the distance between the end (7) of the engagement part (19) and the face (V2) of this furniture panel (2). As a result thereof, the force Fd" which the end (7) of the engagement part (7) exerts on the wall of the bore (4) will always be large, also when exerting a minimal rotary force (Fr) on the furniture panel (2). As a result thereof, the perpendicular assembly of these two panels is child's play and simple. In addition, due to this large build-up of forces, it is not always necessary for the end (7) of the engagement part (19) to be sharp. This may also be spherical or blunt, depending on the requirements of the connection and/or the carrier material used.

FIG. 2d

Furniture assembly (17) of two furniture panels. The connection is fully completed. The furniture panel (2) is at ±90° with respect to the other furniture panel (1). The back part (6) now presses partly against the wall of the bore (4), while the end (7) of the engagement part (19) at least partly penetrates into the wall of the bore (4). The part (6B) of the back part (6) which presses against the wall of the bore (4) is approximately perpendicular with respect to the face (V2) of the furniture panel (2). It will be clear that this does not always have to be the case. Thus, there are various embodiments in which the part (6B) which presses against the wall of the bore (4) is not at a right angle of 90° with respect to the face (V2) of the furniture panel (2). This will be discussed later in this document.

FIG. 3a

Detail of the connecting element (3) of a furniture panel (2) and of the bore (4) in the other furniture panel (1) for producing a perpendicular connection. It shows the distance (A1), i.e. the distance between the back part (6B) which presses against the wall of the bore (4) upon assembly and the end (7) of the engagement part (19). Diameter (D1) is again the diameter of the bore (4) in the other furniture panel (1). In order to produce an assembly, the distance (6B) has to be greater than the diameter (D1) of the bore (4). Then, the end (7) of engagement part (19) will always have penetrated into the wall of the bore over a distance (A3).

In addition, the angle α is indicated, i.e. the angle between the face V2 and the bottom face (V5) of the engagement part (7). This angle is important in order to produce a satisfactory connection between the face (V2) and the face (V1). This is explained in more detail in the drawing (3b).

FIG. 3b

Perpendicular furniture assembly (17) between two furniture panels. The connection is fully completed.

The furniture panel (2) is at ±90° with respect to the other furniture panel (1). The back part (6) now presses partly against the wall of the bore (4), while the end (7) of the engagement part (19) at least partly penetrates into the wall of the bore (4). The part (6B) of the back part (6) which presses against the wall of the bore (4) is approximately perpendicular with respect to the face (V2) of the furniture panel (2).

Due to the fact that the face (V5) on the underside of the engagement part is at an angle α with respect to the plane (V2), the engagement part (7) is pulled slightly further into the bore upon assembly, that is to say if the engagement part is situated at a depth of A3 in the wall of the bore, the connecting element (3) together with the furniture panel (2) will be pulled closer towards the bore. As a result thereof, a beautiful connection between the face (V2) of the furniture panel (2) and the face (V1) of the second furniture panel (1) is achieved. Face (V2) then exerts a pressure force (Fd) on the face (V1) of the first furniture panel (1). How far the furniture panel (2) is pulled towards the second panel (1) is directly proportional to the angle α and the depth A3. However, α must not be excessively large, because otherwise it reduces the connection and may cause the connecting element (3) to slide out of the bore (4) in case of large tensile forces. In addition, the distance (A3) (=the difference between the end (7) of the engagement part (19) and the part (6B) of the back part (6) which pushes against the wall of the bore (4)) must not be chosen too large compared to the diameter D1 of the bore (4), because otherwise it may be impossible to fit due to the fact that the lever has to overcome too great a force.

FIG. 3c

Connecting element (3) according to the invention and an associated bore (4). The drawing indicates the distance A1, which is the distance between the outermost point of the back part (6) and the end (7) of the engagement part (19). Distance A5 is the perpendicular distance between the end (7) of the engagement part (19) and the face (V3) of the side piece (2). The distance (A4) is the distance between the end (7) of the engagement part (19) and the face (V2) of the longitudinal end of the side piece (2). The aim is that, after assembly, the face (V2) of the side piece (2) adjoins the plane (V1) of the front piece (1) as closely as possible. In order to achieve this, it is important to know the angle (δ) at which the turning movement is started. The distance A5 has to be chosen such that A4=A6 (=the distance between the face (V1) of the first panel (1) and the end (7) of the engagement part (19) at the start of the turning movement). This is discussed in more detail in point 3d.

FIG. 3d

The side piece is in a starting position to begin the turning movement. The face V3 of the second panel is at an angle δ with respect to the perpendicular on face V1 of the first panel. With this starting position, it is characteristic that the face V2 of the second panel makes point contact (CP1) with the plane (V1) of the first panel. The back part (6) makes contact (CP3) with the wall of the bore (4). On the opposite side, the end (7) of the engagement part (19) makes contact with the wall of the bore (4). In order to ensure that distance A6=A4, then A6=(A4*cos(δ))+(A5*sin(δ)).

In principle, there will also be tolerance, but it is important that both faces (V2 and V1) adjoin one another as closely as possible in the assembled state.

FIG. 4a

Drawer, wherein three furniture panels are connectable to each other by a connection according to the invention. The drawer consists of five panels, the front panel (1), two side panels (2,13), the rear piece (10) and the bottom (11). The side panels (2,13) and the front panel (1) have to be connected by means of the connecting technique according to the invention. The longitudinal ends of the side panels (2) are provided with two connecting elements (3) according to the invention.

The front panel (1), the two side panels (2,13) and the rear piece are provided with one or several grooves (5). These grooves have various functions, such as a bottom groove, a connecting groove, a runner groove. Also, the panels may be provided with various bores. It should be understood that the number of grooves and bores in the panels may vary infinitely.

In this case, the drawer has to be assembled by first turning the side pieces in the front, then fit the bottom and clamp the rear piece in the side pieces (2 and 13) at the end via a clamp coupling by means of the supplied assembly pegs. These pegs may also already have been incorporated in the drawer. This assembly is discussed in greater detail in this document. It should be understood, however, that there are alternative ways of assembling a drawer in which the connection of the invention is incorporated. These alternative ways may differ in the sequence and/or the clamp couplings used.

FIGS. 4b1; 4b2 and 4b3

Figure 2A:
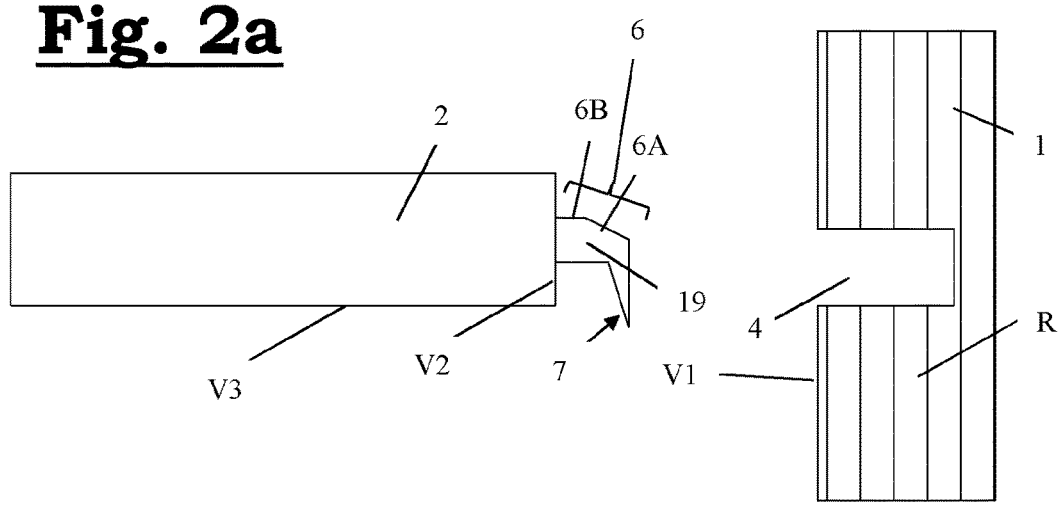
Figure 2D:
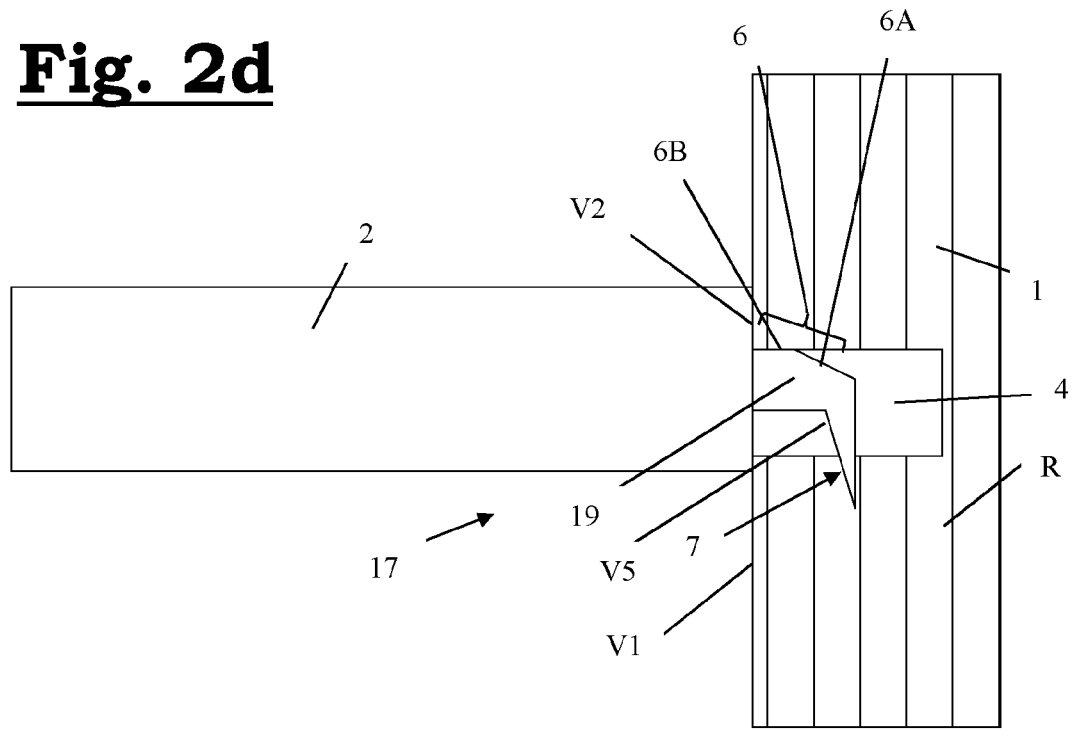
Figure 3A:
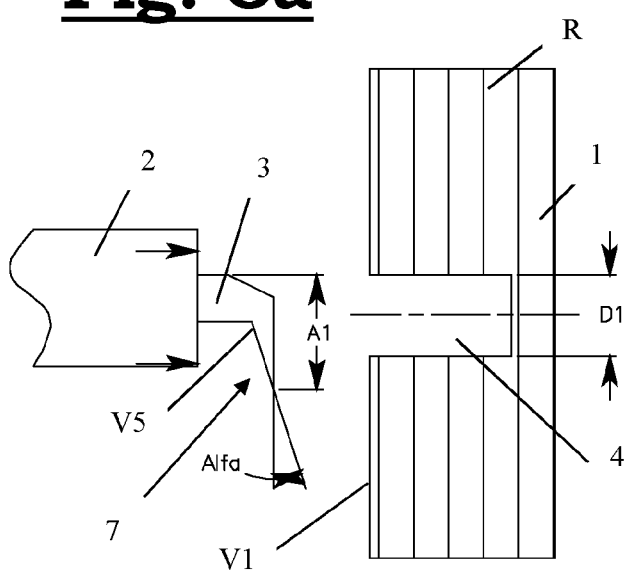
Figure 3B:
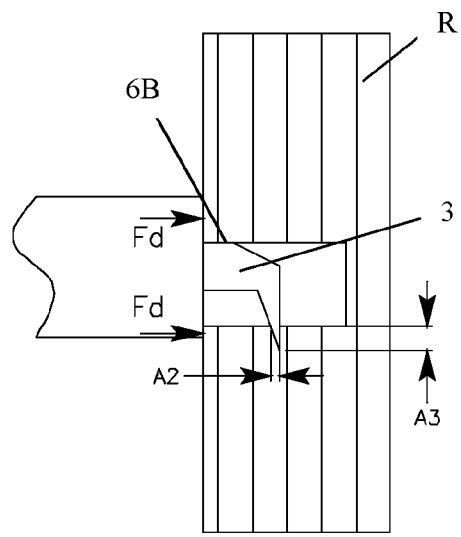
Figure 3C:
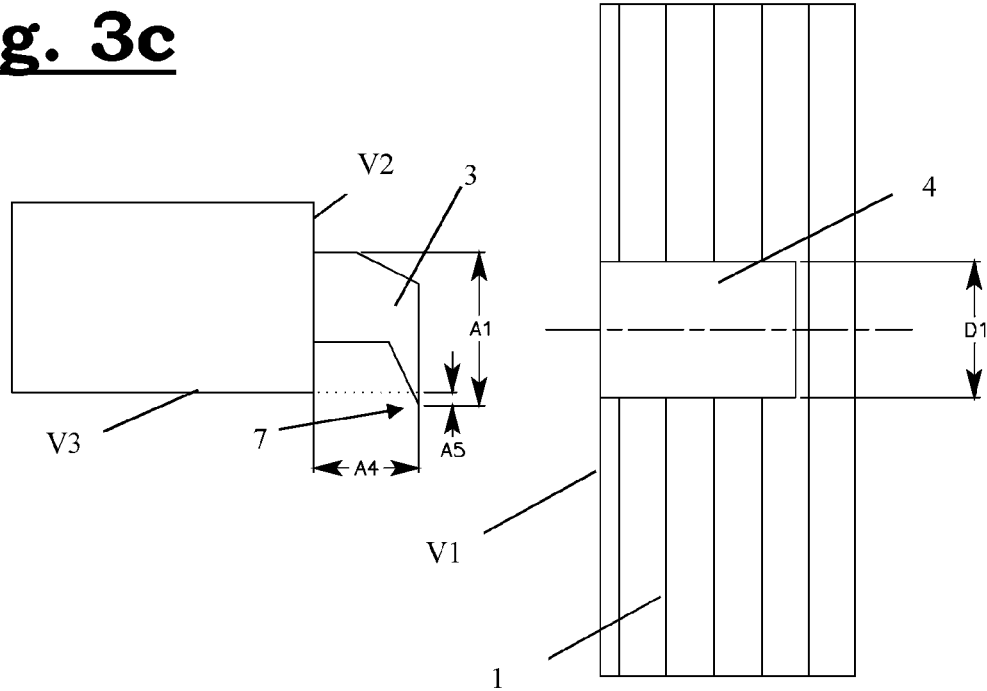
Figure 3D:
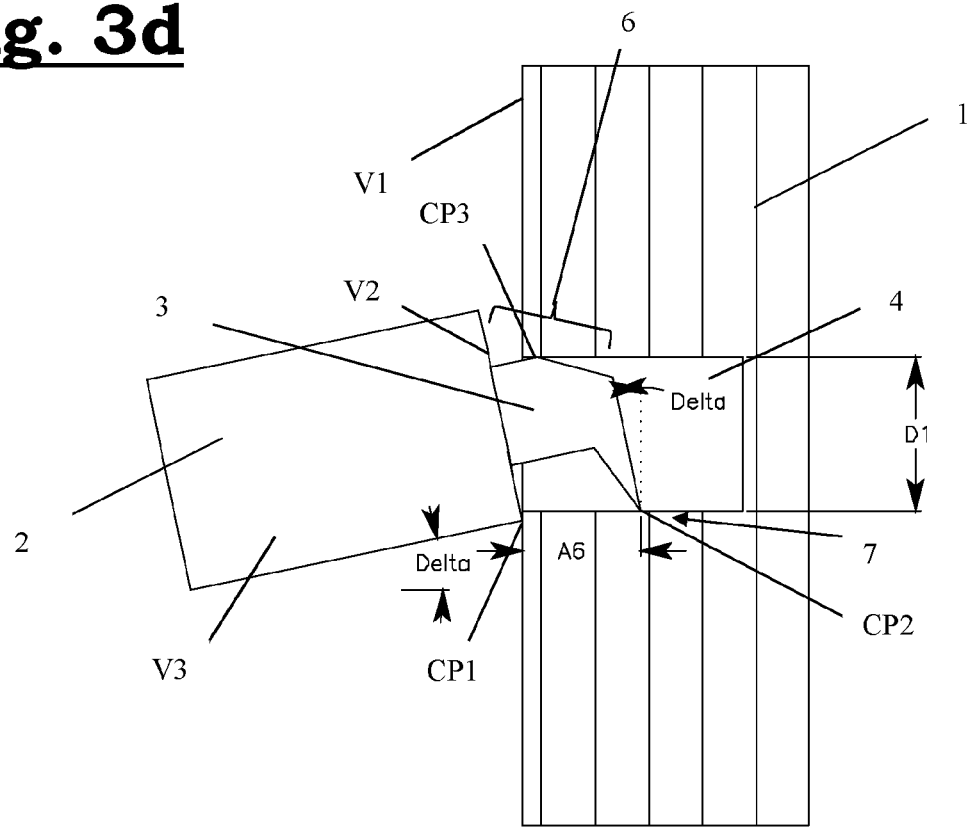
Figure 11:
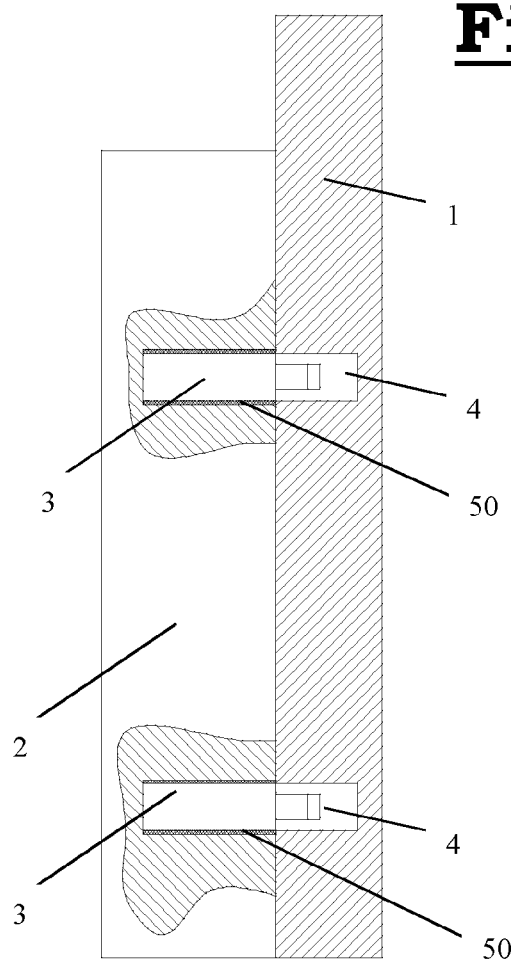
Figure 12:
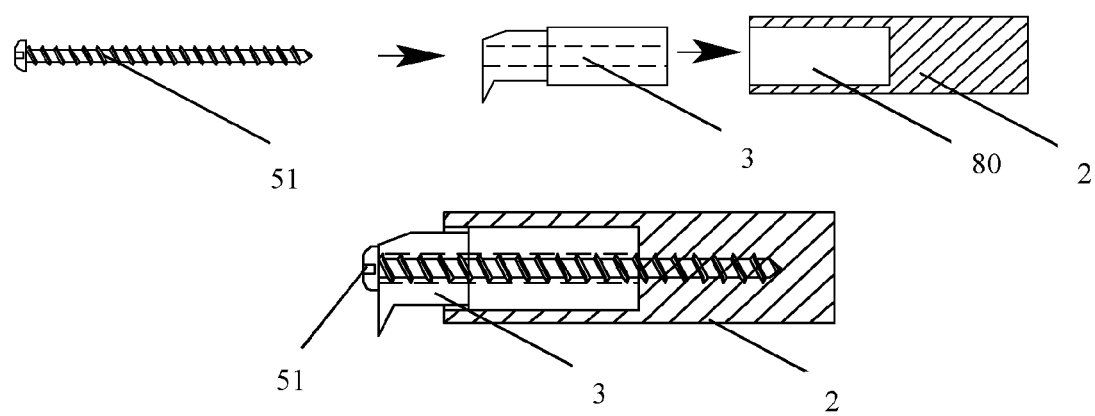
Figure 13:
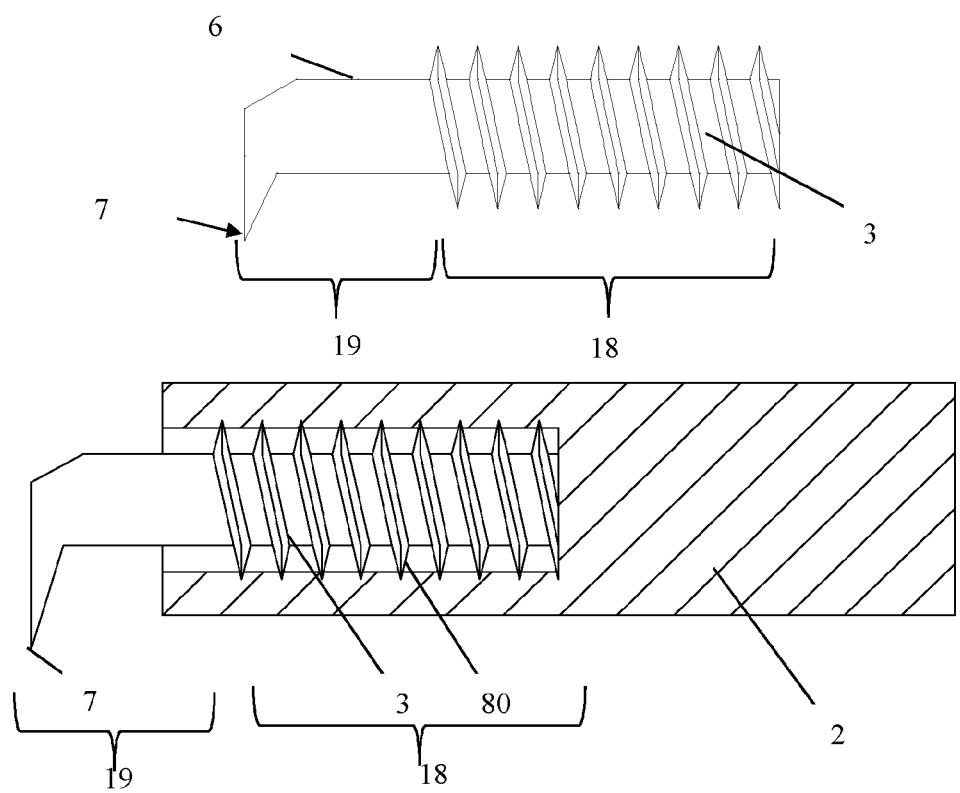

Furniture assembly of two furniture panels at right angles to each other according to the invention. The side panel (2) is fitted in the front panel (1) by means of a connecting element (3) according to the invention. FIGS. 4b2 and 4b3 show a detail of a cross section of the bore (4) during assembly. In his case, the connecting part (3) is inserted into the bore (4) at an angle in a first stage. Thereafter, pressure is exerted on the wall of the bore (4) by means of a lateral turning movement of the side panel (2) via the back part of the connecting element (3). Then, the end (7) of the engagement part (19) starts to penetrate into the wall of the bore (4).

The penetration finishes when the side panel is more or less at right angles to the front panel (1). The hatching (R) is in the same direction as the layer direction of the carrier material of the front panel (1). In many cases, this carrier material is a wood-based panel material, such as an MDF or a chipboard panel. These panels have a distinct layer direction and this layer direction runs parallel to the plane in which the bore (4) is provided. Due to the fact that these panels have a distinct layer direction, the engagement part (19) of the connecting element (3) is able to readily penetrate into the wall of the bore (4). It should be understood, however, that this technique may also be used for panel materials or components which are not layered or where penetration into the wall of the bore (4) of the engagement part has to take place at right angles to the layer direction of the respective panels.

The turning direction of the side panel (2) with respect to the front (1) is now from the inside to the outside, but this may also be the other way around. This may be of interest for certain assembly methods or embodiments. Thus, it may also be the case that the side panel (2) has to be fitted entirely on the side of the front panel, in which case it is better if the engagement part (7) is turned towards the inside of the drawer, because otherwise it might project from the side of the front panel (1), which would not be acceptable aesthetically.

FIGS. 4c1; 4c2 and 4c3

Assembly of the second side panel (13) in the front panel (1) according to the invention. The assembly is the same as the first side panel (2) discussed in FIG. 4b1. FIGS. 4c2 and 4c3 discuss the detail of the cross section of the bore (4) during assembly.

FIGS. 4d1; 4d2 and 4d3

Assembly of the two side panels (2,13) in the front panel (2) according to the invention. The contrast with respect to the drawings discussed above is that the side panels (2,13) now have to be turned from the outside inwards instead of the other way round. This may result in advantages for reasons of assembly technology, such as with the assembly of the rear piece. This is due to the fact that this is clamped between the side panels (2,13). If the side panels have to be turned from the inside out and the rear piece is already provided with integrated coupling means in the longitudinal ends, the side pieces have to be folded over by more than 90°, which could cause damage to the carrier material and/or to the connecting element (3). In this case, it is therefore more practical to turn from the outside inwards. This will be discussed in more detail in this document.

FIG. 4e

Assembly of a drawer box according to the invention. The two side panels (2,13) are already fitted in the front panel (2). The bottom (11) has now been pushed in the box from the rear. To this end, special bottom grooves have been provided in the side pieces (2,13), the front (2) and the rear piece (10).

FIGS. 4f1 and 4f2

Assembly of a drawer box according to the invention. The two side panels (2,13) are already fitted in the front panel (2) and the bottom (11) has already been pushed in the box. Now, the rear rear piece is being fitted. To this end, grooves are provided on the rear side of the two side panels (2,13). The longitudinal ends of the rear piece are also provided with coupling means in the form of screw elements. These are situated completely in the rear piece and can be screwed out by means of a screwdriver. It should be understood that alternative connections are possible, as will be discussed in more detail in this document.

FIGS. 4g and 4h

Assembly of a drawer box according to the invention. By means of a screwdriver (12), the screw elements (14) are screwed out of the longitudinal ends of the rear piece. As a result thereof, they rotate in the bores (42) in the side pieces (2,13) and a connection is produced between the intermediate piece (10) and the side pieces (2,13).

FIG. 4i

Assembly of a drawer box according to the invention. Instead of a screw element (14) which is installed in the rear piece, the connection is now created between the rear piece (11) and the side pieces (2,13) by inserting special plugs (43) from outside into the rear piece via the side pieces (2,13). As a result thereof, a connection is produced between the side pieces and the rear piece.

FIGS. 4j1; 4j2; 4j3 and 4j4

Assembly of a drawer box according to the invention. This is again an alternative way of fitting the intermediate piece (10) in a drawer box. The longitudinal ends of the rear piece are provided with coupling means (41) comprising barbs. These coupling means have to be pushed into the bores (42) provided for this purpose. Both bores (42) and the coupling means (41) are provided with barbs, resulting in a strong connection. These coupling means (41) may have been screwed into the rear piece, but may also have been glued, for example. The bores (42) are now continuous, but may equally be blind, as a result of which nothing is visible on the outside of the drawer box.

FIG. 5

Connection between two furniture panels according to the invention. In addition to a good connection between the side pieces (2,13) and the front (1), the position of the side pieces with respect to the front is of great importance. Therefore, it may be of interest to also provide an additional dowel in addition to the connecting elements (3). This then ensures a perfect positioning. However, in many cases this is superfluous. After all, the connecting element (3) can not only ensure a connection, but in many cases a positioning as well. Therefore, an additional dowel is not always required.

FIGS. 6.1; 6.2; 6.3 and 6.4

Connecting element (3) according to the invention. Between the back part (6) and the end of the engagement part (19), a groove (16) is provided. It serves as a tension control during assembly. During the turning movement, a dead point or dead force is overcome. The compressive stress which occurs between the end (7) and the back part (6) pushes the two parts (6 and 7) towards each other, until the smallest distance has been bridged (FIG. 6.3). The advantage of such a groove is that significantly less force has to be used and also that, once the side piece has been fitted, it remains approximately perpendicular with regard to the front (1), since a dead point has been overcome. The figure shows that the groove (16) is arranged at an angle (α). Depending on the desired tension or material, this angle α may be different. In addition, the depth of the groove (16) may also be different.

FIGS. 7.1; 7.2; 7.3 and 7.4

Connecting element (3) according to the invention. The figures are similar to FIGS. 6.1-6.4, but with the significant difference that the engagement part (19) consists of various tongues/projections (22). As a result thereof, the grip which is created may be greatly increased. Between the tongues, there is a small flat piece which may be regarded as a stop. As a result thereof, penetration of the engagement part (19) into the wall of the bore (4) is limited. As a result thereof, the connection gains additional stability and a better positioning of the side piece (2) with respect to the front (1) is achieved.

FIGS. 8.1 and 8.2

Connection according to the invention. Connecting element (3) may take various forms. Here, the end (7) of the engagement part (19) has a round contour. This may be of interest during penetration into the wall of the bore. In addition, the back part (6) has a rounded contour. It should be understood that several forms are possible and that these forms are combinable with the technical characteristics already discusses above.

FIGS. 9.1 and 9.2

Connection according to the invention. Connecting element (3) may take various forms. Here, the end (7) of the engagement part (19) has a straight contour. This may be of interest during penetration into the wall of the bore. In addition, the back part (6) has a rounded contour. It should be understood that several forms are possible and that these forms are combinable with the technical characteristics already discussed above.

FIGS. 10.1 and 10.2

Connection according to the invention. The coupling means (3) may take various forms. Here, the end (7) of the engagement part (19) has a straight contour. This may be of interest during penetration into the wall of the bore. The back part (6) also has a straight contour. As a result thereof, the back part (6) is more likely to make a point contact with the wall of the bore (4), while with a round contour, there is more likely to be a face which makes contact. It should be understood that several forms are possible and that these forms are combinable with technical characteristics which have already been discussed.

FIG. 11

Cross section of a connection between a side panel (2) and a front panel (1). There are two connecting elements (3) present. These connecting elements (3) are glued into the side panel (50). However, various fitting options are known for fastening the connecting element (3) in the side piece. Such as gluing, screwing, clamping or melting. In certain cases, the connecting element (3) may also be made of the same material as the side panel (2) itself. Just think of a side piece made of plastic or metal, or optionally of wood, in which the connecting element (3) is milled.

FIG. 12

A connecting element (3) according to the invention. The connecting element (3) is fitted in the side piece (2) by means of a screw (51) which has been screwed through the connecting element (3) and into a bore of the side piece (2). The advantage of this type of attachment is that the engagement part (19) can easily be fitted in the correct direction. Optionally, barbs could be provided in the longitudinal direction of the connecting element (3), so that the latter is unable to rotate in the bore after assembly.

FIG. 13

A connecting element (3) according to the invention. The connecting element is fitted in the side piece (2) by screwing it into the bore (80) of the side piece. This is an inexpensive and quick way of assembling. In addition, it offers the advantage that the connecting element (3) is supplied separately, as a result of which the assembler still has to fit it. The connecting element consists of an elongate securing part (18) and an engagement part (19), wherein the engagement part is composed of, on the one hand, a back part (6) and, on the other hand, an end (7).

Figure 14A:
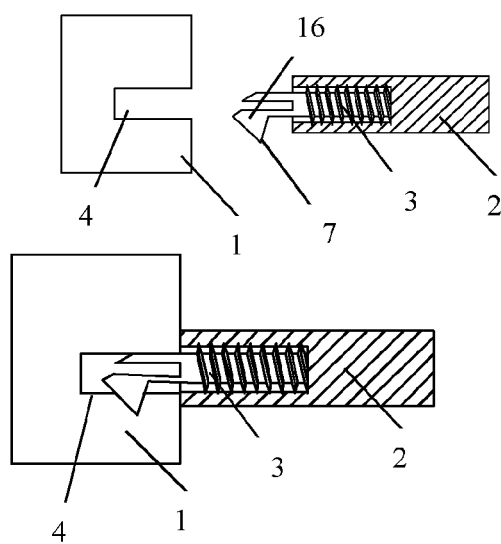
Figure 14B:
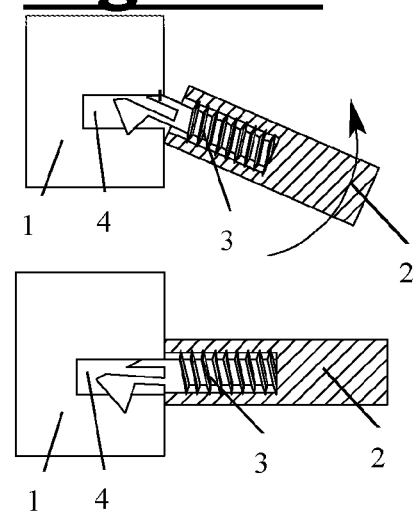
Figure 18:
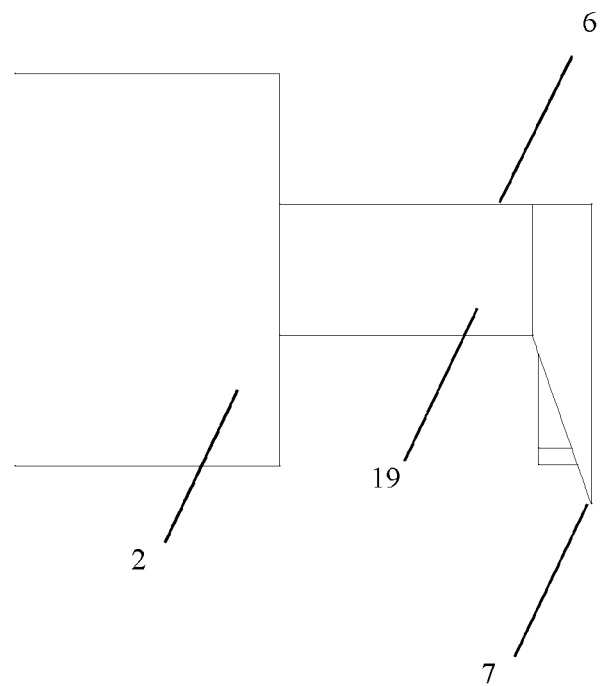

FIGS. 14a and 14b

A connecting element (3) according to the invention. The connecting element (3) is fitted in a bore (80) in the longitudinal end of a panel (2). There is another panel (1) which is provided with a bore (4). The connecting element (3) is provided with a groove (16) which separates the end (7) of the engagement part (19) from the back part (6). As a result thereof, the engagement part (19) and/or the back part (6) become slightly elastic, as a result of which they/it can deal with a certain degree of bending stress. This makes it possible to both turn (FIG. 14b) and also snap (=laterally insert/FIG. 14a) the panel (2) into the bore (4) of the first panel (1). In certain cases, this may be necessary in order to assemble the panels or a box in its entirety.

FIGS. 15a and 15b

A connecting element (3) according to the invention. It is a variant of the connecting element (3) discussed in FIGS. 14a and 14b, the difference being that a small barb/projection (21) is provided on the back part (6) as well. This may be of interest in order to prevent the connecting element (3) from becoming detached by turning or in order to achieve a better attachment.

It should be understood that other embodiments or combinations of the above-described embodiments are possible.

FIGS. 16a;16b and 16c

A rear view (16.a), a side view (16.b) and a top view (16.c) of a connecting element (3) according to the invention. The end (7) of the engagement part (19) is part of a circular or oval-shaped part.

The maximum distance (A7) of this oval-shaped part transversely to the connecting line between the end (7) and the back part (6) is slightly to a little smaller smaller than the cross section (D1) of the bore (4) of panel (1). After all, the aim is that this circular or oval-shaped part ensures the positioning of panel (1) with respect to panel (2) in the direction (Z2). It should be understood that still other embodiments are possible. Thus, the positioning in the (Z2) direction may also be ensured by special projections transversely to the connecting line between the end (7) of the engagement part (19) and the back part (6). These projections do not have to form an integral part of the engagement part (19) and certainly do not have to be situated at the same height as the engagement part.

At the bottom of the engagement part (19), on the side of the end (7), another projection (60) is provided. The distance (A8) of the maximum point of this projection (60) and the maximum point of the back part (6) is slightly to a little smaller than the cross section (D1) of the bore (4) of the panel (1). As a result thereof, the positioning of the panel (2) with respect to the panel (1) is ensured in the direction Z1.

It should be understood that still other embodiments or forms of the securing part are possible in order to ensure the anchoring of the positioning of panel (1) with respect to the panel (2), both in direction Z1 and in direction Z2.

FIGS. 17a and 17b

Cross sections of a assembly comprising a connecting element (3) according to the invention. FIG. 17a again shows a cross section of a connection, seen in top view of the connection, FIG. 17b shows a side view of the connection. The maximum distance (A7) of the oval-shaped or circular part transversely to the connecting line between the end (7) of the engagement part (19) and the back part (6) is slightly to a little smaller than the cross section (D1) of the bore (4) of panel (1). After all, the aim is for this circular or oval-shaped part to ensure the positioning of panel (1) with respect to panel (2) in the direction Z2. This distance (A7) has to be smaller than the cross section (D1) anyway, since it would otherwise not be possible to fit the connecting element (3) in the bore (4), or at least not easily. On the underside of the engagement part (19), on the side of the end (7), a projection (60) is present. The distance (A8) of the maximum point of this projection (60) and the maximum point of the back part (6) is slightly to a little smaller than the cross section (D1) of the bore (4) of the panel (1). As a result thereof, the positioning of the panel (2) with respect to the panel (1) is ensured in the direction Z1. It should be understood that still other embodiments or forms of the connecting element are possible in order to ensure the anchoring of the positioning of panel (1) with respect to panel (2), both in direction Z1 and in direction Z2.

FIG. 18

Connecting element according to the invention. It is a variant of a connecting element which has already been described above, the difference being that the back part (6) is now completely straight. This does not hamper assembly and may in certain cases be of interest.

Figure 19A:
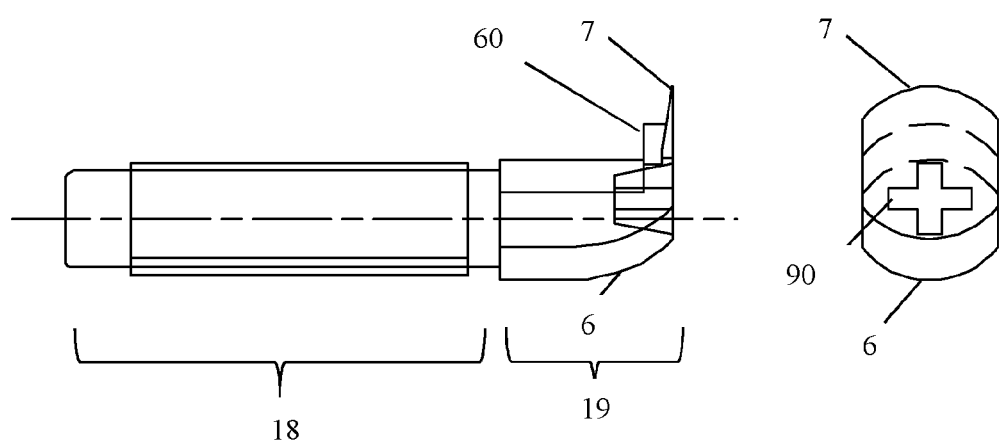
Figure 19B:
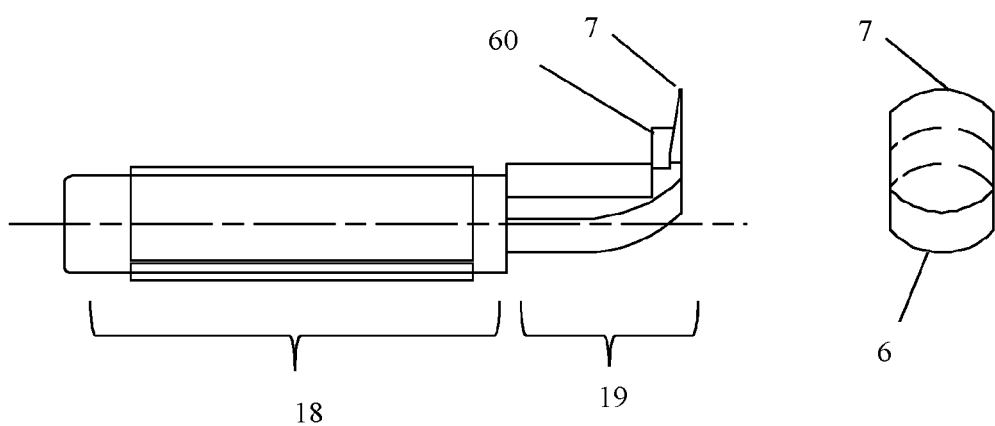

FIGS. 19a and 19b

Alternative embodiments of a connecting element according to the invention. FIG. 19a shows that there is a cross (90) on the top of the connecting element (3). This serves to be able to easily screw the connecting element (3) in the side piece (2) by means of a screwdriver.

FIG. 19b shows that the engagement part (19) has been displaced with respect to the securing part (18). This has the advantage that the bore in the side piece (2) can be drilled slightly further away from the side (V2) of the side piece (2), as a result of which there will be no visible damage or deformation to the side (V2) of side piece (2).

The invention claimed is:

1. Furniture assembly (17) comprising first and second furniture panels (1,2) which are connected at right angles to each other, at least two connecting elements (3) suitable for producing a perpendicular connection between the first and second furniture panels (1,2);
   wherein both the first and second furniture panels (1,2) are provided with at least two spaced-apart blind bores (4, 80) for receiving at least a part of the connecting elements (3), wherein the connecting elements (3) each comprises an elongate securing part (18) at a first end and a bent engagement part (19) at a second end, wherein the engagement part furthermore comprises a back part (6) which includes a part (6B) perpendicular to the face (V2) and a part (6A) that is less than 90 degrees with respect to the face (V2);
   wherein the blind bores (80) in the second panel (2) are provided in a head end side of the second panel (2), wherein the elongate securing part (18) of each connecting element (3) is at least partly disposed in a blind bore (80) and the bent engagement part (19) of the connecting element (3) extends beyond a side face (V3) of the second panel (2) in which the securing part (18) of the connecting element (3) is disposed, and an end of the bent engagement part (19) of the connecting element (3) penetrates a wall of a blind bore of the first panel (1);
   wherein once the connecting elements are coupled, the connecting elements are fully encompassed within the blind bores and thus not visible.

2. Furniture assembly according to claim 1, wherein the end (7) of the engagement part (19) comprises one or several pointed projections (22).

3. Furniture assembly according to claim 1, wherein the engagement part (19) comprises one or several positioning means (60) for positioning the first furniture panel with respect to the second furniture panel.

4. Furniture assembly according to claim 1, wherein the back part (6) which, in use, at least partly bears against a part of the wall of the bore (4) situated opposite a part of the wall of the bore (4) into which the end (7) of the engagement part (19) penetrates, in use.

5. Furniture assembly according to claim 1, wherein the engagement part (19) comprises a groove (16).

6. Furniture assembly according to claim 1, wherein the head-end front or rear side of the second furniture panel (2) is provided with two spaced-apart connecting elements (3).

7. Furniture assembly according to claim 1, wherein the head end side (V2) of the second furniture panel (2), where the elongate securing part (18) of the connecting element (3) is at least partly provided, adjoins with a plane (V1) of the first furniture panel (1).

8. Furniture assembly according to claim 1, wherein securing part (18) is provided with screw thread in order to secure the connecting element (3) in the first furniture panel (1).

9. Furniture assembly according to claim 1, wherein the first furniture panel and/or the second furniture panel is made from MDF, chipboard, multiplex or another wood-based panel material.

10. Furniture assembly according to claim 1, wherein the furniture assembly is suitable for forming a drawer.

* * * * *